United States Patent [19]

Glancy et al.

[11] Patent Number: 5,629,373
[45] Date of Patent: May 13, 1997

[54] WATER BASED COATING COMPOSITION CONTAINING AN AMINOPLAST-ETHER COPOLYMER

[75] Inventors: Charles W. Glancy; Alan L. Steinmetz, both of Louisville, Ky.

[73] Assignee: United Catalysts, Inc., Louisville, Ky.

[21] Appl. No.: 476,216

[22] Filed: Jun. 7, 1995

[51] Int. Cl.$^6$ .............................. C08L 61/00; C08L 61/32; C08G 12/26; C08G 12/32

[52] U.S. Cl. .......................... 524/512; 524/590; 524/591; 524/598; 528/230; 528/249; 528/252; 528/254; 528/261

[58] Field of Search .................... 524/512, 593, 524/597, 598, 590, 591, 843; 528/230, 261, 249, 252, 254

[56] References Cited

U.S. PATENT DOCUMENTS

| | | | |
|---|---|---|---|
| 3,756,992 | 9/1973 | Dieterich | 524/591 |
| 4,093,579 | 6/1978 | DeLapp et al. | 524/512 |
| 4,228,055 | 10/1980 | Wallace | 524/512 |
| 4,833,177 | 5/1989 | Faler et al. | 524/512 |
| 5,071,904 | 12/1991 | Martin et al. | 524/813 |
| 5,084,506 | 1/1992 | Faler et al. | 524/597 |
| 5,276,130 | 1/1994 | Bradford et al. | 524/593 |

Primary Examiner—Tae Yoon
Attorney, Agent, or Firm—Dorsey & Whitney LLP

[57] ABSTRACT

A coating composition containing a linear aminoplast-ether copolymer of the formula:

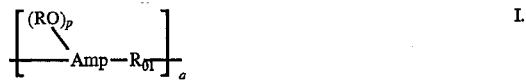

where the divalent $R_{01}$ contains a divalent alkyleneoxy containing moiety, Amp is the skeletal residue of an aminoplast, R is hydrogen, alkyl containing 1 to about 4 carbon atoms, and acyl containing 1 to about 4 carbon atoms, p is a positive number that is equal to the free valence of Amp minus 2, RO is bonded to alkylene units of Amp, and a is a number greater than 1.

118 Claims, No Drawings

WATER BASED COATING COMPOSITION CONTAINING AN AMINOPLAST-ETHER COPOLYMER

BRIEF DESCRIPTION OF THE INVENTION

A water-based coating composition containing a water soluble linear aminoplast-ether copolymer containing aminoplast segments interlinked through ether segments.

BACKGROUND TO THE INVENTION

Aminoplasts are defined herein and in the claims as an A-stage class of thermosetting resin based on the reaction of an amine with an aldehyde and the related acetals containing amines or amides. The most commercially used aldehyde is formaldehyde, and the most important amines are urea and melamine. They are used in molding, adhesives, laminating, textile finishes, permanent-press fabrics, wash-and-wear apparel fabrics, protective coatings, paper manufacture, leather treatment, binders for fabrics, foundry sands, graphite resistors, plaster-of-paris fortification, foam structures, and ion-exchange resins. A significant structural component of an aminoplast resin is the amino group to which is bonded at least one alkylol or alkylol ether or ester functional group. Those functional groups enter into condensation (heterolytic) reactions and provide the leaving groups for the reaction. The aminoplast typically provides at least two of such amino groups per molecule and one or two functional groups per amino group. The condensation reaction can generate a low to moderate molecular weight polymer (as would occur in making a B-stage resin), a highly crosslinked polymer (as would occur in making a thermoset C-stage resin) by homopolymerization or copolymerization, or it can generate a modification of the resin that either provides other type functionality or eliminates such functionality from the resin. For example, a starting monomer that contains the amino group with an associated methylol or methylol ether or ester group can be partially condensed and modified with a monomer that possesses, in addition, different functionality (such as ethylenic unsaturation) and such partial modification allows the aminoplast to be dimerized, oligomerized or polymerizod by a homolyric reaction through such different functionality to form aminoplasts with a plethora of methylol and/or methylol ether and/or ester groups. This same result can be achieved by different route, by having the skeleton of the aminoplast possess other functional groups that can enter into heterolytic or homolyric reactions. For example, methacrylamide can be reacted with formaldehyde to form an aminoplast, and through the unsaturation, polymerization can be effected to create a linear polymer with pendant methylol or methylol ether or ester functional groups. Illustrative of such aminoplasts are the following:

FIG. 1. Partial list of aminoplasts

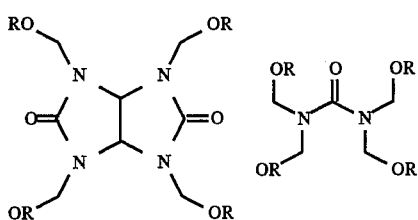

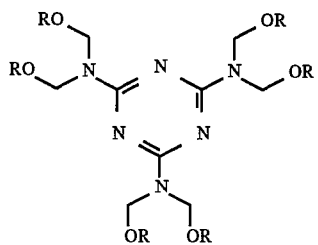

FIG. 1. Partial list of aminoplasts

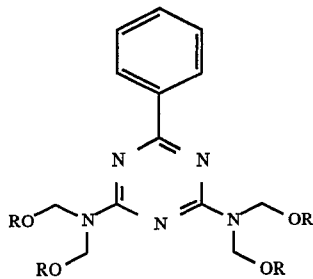

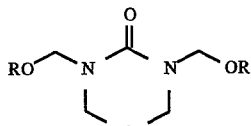

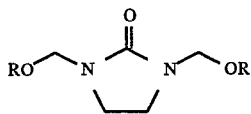

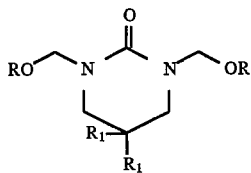

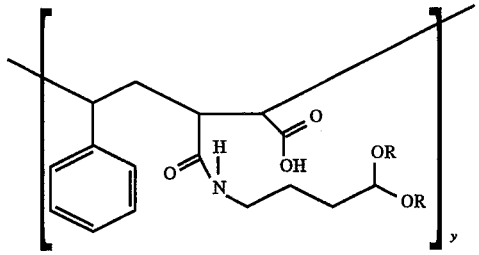

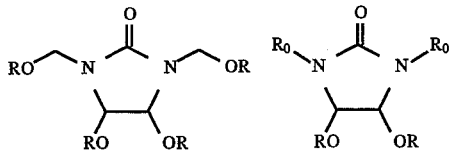

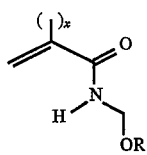

-continued
FIG. 1. Partial list of aminoplasts

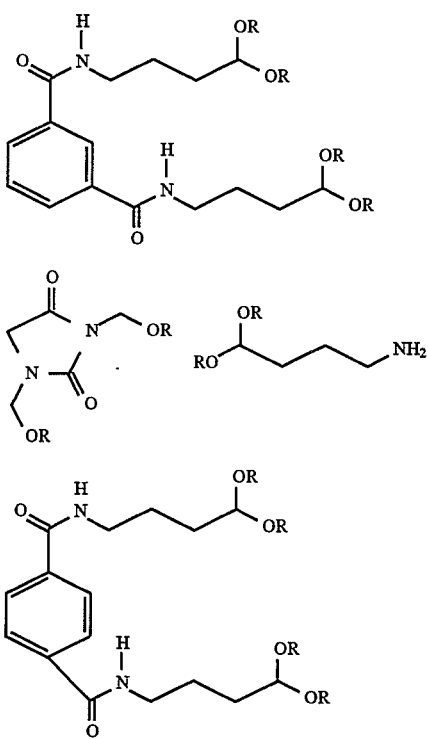

wherein R is hydrogen, alkyl containing 1 to about 4 carbon atoms, and acyl containing 1 to about 4 carbon atoms; $R_0$ is alkyl of from 1 to about 4 carbon atoms, aryl, cycloalkyl, and the like; $R_1$ is alkyl of from 1 to about 4 carbon atoms; and x is 0 or 1, and y is at least 2.

The RO— functionality of such aminoplasts provide the leaving groups of the alkylol (e.g., methylol) or alkylol ether or ester (e.g., methylol ether or ester) functional groups. Alkylol (e.g., methylol), alkylol ether (e.g., methylol ether) or alkylol ester (e.g., methylol ester) groups can condense with themselves to form ROH volatile compounds or water. They can condense with complementary functional groups, such as compounds containing active hydrogen groups, e.g., primary and secondary amines, carboxylic acids, alcohols, phenols, mercaptans, carboxamides (including amides from urea, thiourea), and the like.

Most aminoplasts contain a minor amount of dimer and oligomer products. These products are formed in the making of the aminoplast and represent precondensation between aminoplast monomers. The dimer and oligomer products contain substantially more —OR functionality than the aminoplast monomer.

As noted above, aminoplasts are used to form thermoset resin structures. Because they contain at least two RO— functional groups, they are used to react in systems that contain at least two complementary functional groups. Frequently, aminoplasts are added to resin formulations as one of many components. In such embodiments, there are no perceptible step-wise reactions between the aminoplast and any other component of the formulation. In such situations, it is not feasible to determine with any degree of accuracy as to which of the specific components of the formulation the aminoplast reacts.

The term "associative thickener" is art recognized to mean a nonionic hydrophobically modified water-soluble polymer capable of interacting in aqueous solution with itself and with other species such as latex particles. Typically they are made by polymerizing polyethylene oxide prepolymers with isocyanates. Mono-ols or diols with large aryl, alkyl, or aryl/alkyl groups are included to provide the hydrophobic modification. They are described in a number of patents. Hoy et al., U.S. Pat. No. 4,426,485, patented Jan. 17, 1984, broadly describes these materials as "a water-soluble, thermoplastic, organic polymer... having segments of bunched monovalent hydrophobic groups." This patent, in its "Description of the Prior Art," discusses a major segment of the prior art, and without endorsing the conclusions therein stated, reference is made to such description to offer a background to this invention.

The two Emmons et al. patents, U.S. Pat. No. 4,079,028 and U.S. Pat. No. 4,155,892, patented Mar. 14, 1978 and May 22, 1979, respectively, describe polyurethane associative thickeners that contain hydrophobic groups interconnected by hydrophilic polyether groups. The thickeners are nonionic.

There are a number of commercial associative thickeners based on the descriptions of the Hoy et al. and Emmons et al. patents.

Background on the use of thickeners in waterborne polymer systems, including those embraced in the characterization of this invention is set forth in the extensive literature on the subject, such as U.S. Pat. Nos. 4,426,485, 4,155,892, 4,079,028; 3,035,004; 2,795,564; 2,875,166 and 3,037,952, for example. The polymeric thickeners of this invention are also suitable as substitutes for the polymeric thickeners in the polymeric systems disclosed in U.S. Pat. Nos. 2,875,166 and 3,035,004 and in Canadian Pat. No. 623,617.

For the purposes of this invention and the discussion of the prior art, the skeletal unit of the aminoplast is the structure of the aminoplast minus the RO— leaving groups bonded to alkylene of the alkylol or alkylol ether or ester of the aminoplast, regardless of whether any of the RO— groups are removed from the aminoplast. That skeletal unit is referred to herein and in the claims as "Amp."

In the following description and in the claims hereof, the term "water dispersible," as such relates to aminoplast containing compositions and precursors to such compositions, that are water soluble or mechanically dispersible in water in a stable particulate form. A stable particulate form is one that retains its chemical characteristics after an extended period of time. It can be mechanically mixed in such particulate form in water, for an extended period of time at normal ambient conditions.

The term "linear," when used herein and in the claims to characterize a polymer, relates to a polymer that is devoid of crosslinking or branching that renders the polymer solid and cured. A "wholly linear" polymer is a polymer that is devoid of crosslinking and branching. A linear polymer may or may not be a wholly linear polymer.

The symbols and designations used herein are intended to be consistently applied, especially as used in formulations and equations, unless specifically stated otherwise.

THE INVENTION

This invention relates to novel waterborne coating compositions. Such compositions are thickened or provided with wetting agent capabilities by the inclusion in the composition of an aminoplast-ether copolymer formed by a process that does not rely on an urethane-forming polymerization reaction in order to generate the copolymer's backbone structure.

This invention relates to a novel water-based coating composition because of the presence in the composition, in addition to the coating vehicle, of a linear aminoplast-ether copolymer of the formula:

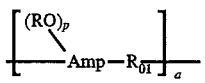

where the divalent $R_{01}$ contains a divalent alkyleneoxy containing moiety, Amp is the skeletal residue of an aminoplast, as stated above, R is defined above, p is a positive number that is equal to the free valence of Amp minus 2, RO is bonded to alkylene units of Amp, and a is a number greater than 1, preferably greater than 2. Amp includes any dimer and oligomer component of the aminoplast. In a much preferred embodiment of the invention, $R_{01}$ is derived from a water dispersible alkylene polyether, preferably a water soluble alkylene polyether, and the novel linear aminoplast copolymer of the invention is water dispersible, and preferably, water soluble.

In addition, the invention relates to a novel water-based coating composition that contains a linear aminoplast-ether copolymer possessing one or more pendant groups, preferably hydrophobic pendant groups. Such a copolymer contains a unit of the formula:

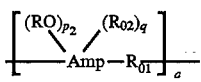

wherein $R_{02}$ is a hydrophobic group, different from RO—, that is covalently bonded to Amp through a heteroatom and contains at least two carbon atoms, preferably at least two sequential carbon atoms, $p_2$ is number that is equal to the free valence of Amp minus (2+q), and q is a positive number. The copolymer preferably contains a ratio of q/a that is at least about 0.01.

In another embodiment of the invention, the invention relates to a novel water-based coating composition that contains a linear aminoplast-ether copolymer possessing end groups characterized by a component of the units making up the copolymer, or a monofunctional group that effectively end-caps the copolymer, forming the end group. This yields a copolymer of the formula:

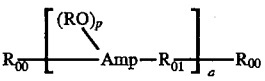

wherein each $R_{00}$ is the same or different terminal group, such as hydrogen, —$R_{01}$—H, Amp bonded —$(OR)_{p1}$, —Amp—$(OR)_{p1}$, or any other monofunctional organic groups, such as alkyl, cycloalkyl, aryl, alkaryl, aralkyl, alkyoxyalkyl, aroxyalkyl, cycloalkoxyalkyl, and the like, and $p_1$ is a positive number that is equal to the free valence of Amp minus 1. In addition, the invention encompasses the use in the coating composition of a copolymer of the formula:

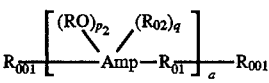

where each $R_{001}$ is the same or different, and is $R_{00}$ or $R_{02}$.

A particularly preferred linear aminoplast-ether copolymer comprises units of the formula:

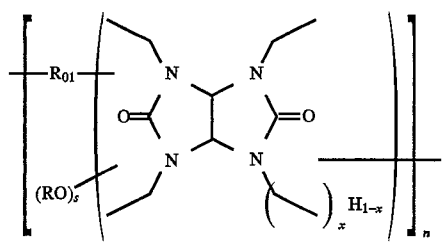

wherein $R_{01}$ and R are described above, n has a value of at least 2, x is 0 or 1, s is (3+x)–2, and the average value of x in the copolymer is about 0 to about 0.05. Another preferred composition of the invention is a novel linear aminoplast-ether copolymer having the formula:

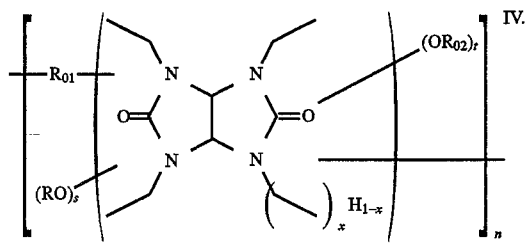

where s+t equals (i) the free valence of the

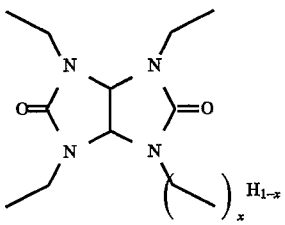

moiety and (ii) 4–x; and the average value of t/s+t is about 0.01 to about 0.5.

In a further preferred embodiment of the invention, the linear aminoplast-ether copolymer employed in the coating composition of the invention comprises a copolymer that possesses end groups as illustrated by the following structure:

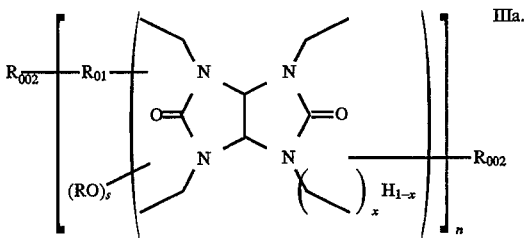

wherein each $R_{002}$ is the same or different terminal group, such as hydrogen, —$R_{01}$—H, —$(OR)_{p1}$, —$Amp^o$—$(OR)_{p1}$, or any other monofunctional organic groups, such as alkyl, cycloalkyl, aryl, alkaryl, aralkyl, alkyoxyalkyl, aroxyalkyl, cycloalkoxyalkyl, and the like, and $p_1$ is a positive number that is equal to the free valence of $Amp^o$ minus 1. $Amp^o$ is depicted in formula V. In a preferred embodiment of the invention, the linear aminoplast-ether copolymer comprises a copolymer that possesses end groups affecting the performance of the copolymer. Such embodiment is illustrated by the following structure:

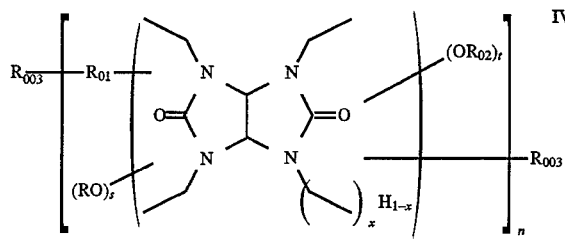

wherein each $R_{O03}$ is the same or different terminal group, such as hydrogen, $-R_{O1}-H$, $-(OR)_{p1}$, $-Amp^o-(OR)_{p1}$, $-OR_{O2}$ or any other monofunctional organic groups, such as alkyl, cycloalkyl, aryl, alkaryl, aralkyl, alkyoxyalkyl, aroxyalkyl, cycloalkoxyalkyl, and the like, and $p_1$ is a positive number that is equal to the free valence of $Amp^o$ minus 1. $Amp^o$ has the same meaning as Amp.

In the foregoing characterizations set forth in formulae I, Ia, II, IIa, III, IIIa, IV, and IVa, each —OR and $-OR_{O2}$ group is directly bonded to Amp through a hydrocarbyl moiety bonded to nitrogen therein.

This invention relates to aqueous coating systems that contain any one or more of the above defined compositions. For example, the invention relates to a thickened water-based latex coating composition in which water and the coating resin are present in a major amount and one or more of the following aminoplast-based compositions are present in a minor amount:

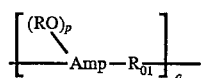  I.

or

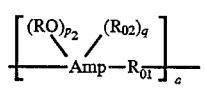  II.

which formulae are described above. Particularly preferred are thickened water containing coating systems in which the aminoplast-based compositions are of the following formulae:

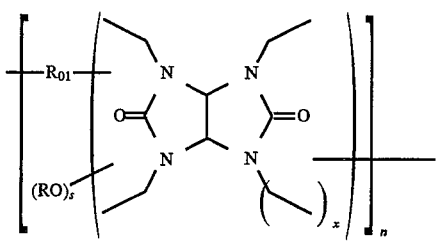  III.

or

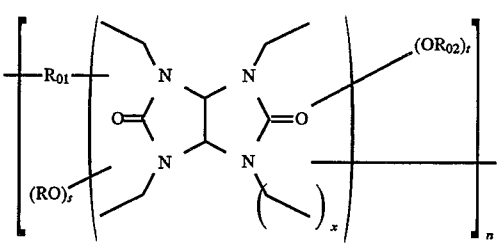  IV.

or

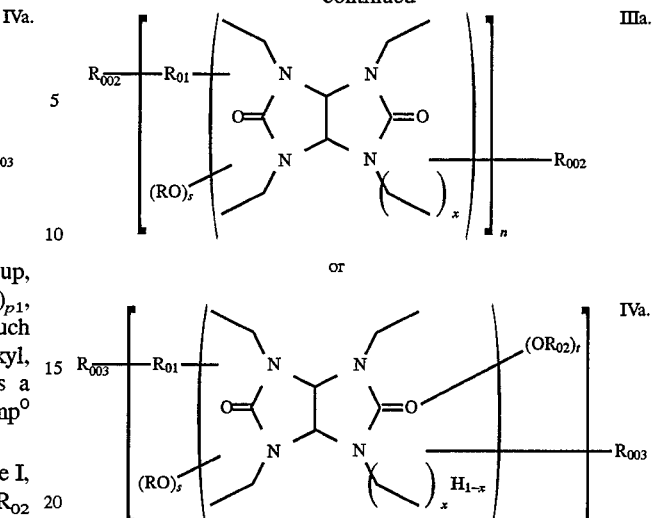

which formulae are described above. The coating composition may contain as little as 0.01 to as much as 10 weight percent of the aminoplast-ether copolymer, basis weight of the coating composition exclusive of fillers, pigments and like additives. The ultimate coating composition and its properties will dictate the amount of the copolymer that is employed. The preferred amount is that amount that contributes thickening or wetting agent properties to the coating composition.

In addition, the invention relates to a water-based coating composition that contains a major amount of water, and a minor amount of an associative thickener of the formula:

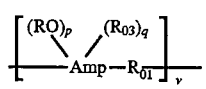  VI.

wherein $R_{O3}$ is a monovalent hydrophobe, and v has an average value of about 2 to about 10,000, and an amount of a "dispersed coating polymer" that is greater than the amount of the associative thickener, which dispersed coating polymer provides the basic coating attributes of the composition. In this sense, the dispersed coating polymer is typically solvent dispersible, i.e., it has the capacity of being dissolved by a solvent, and on drying the composition, i.e., removing water and solvent present, the dispersed polymer is curable to either a solid thermoset structure or a solid thermoplastic.

DETAILED DESCRIPTION OF THE INVENTION

The linear aminoplast-ether copolymers of formula I et seq. are made by the novel condensation reaction of a polyfunctional aminoplast with a di-functional polyether (alone or with another polyol, as characterized with respect to formulae XII and XIII) in the presence of an acid catalyst. In the prior art, as noted above, aminoplasts are condensed with polyfunctional compounds to produce thermosetting resins or thermoset products (i.e., C-stage resin). The reaction of this invention produces a linear copolymer. Thus, the copolymers of formulae I, II, III, IV, and V are either liquid or thermoplastic solids that are solvent soluble and water dispersible.

The linear aminoplast-ether copolymer are made by the copolymerization reaction of a polyfunctional aminoplast with an ether containing two active hydrogen terminal groups, in the presence of an acid catalyst, especially a Brönsted-Lowery acid provided in catalytically effective amounts. The reaction is continued until the desired molecular weight is achieved. The desired molecular weight of the copolymer is dependent on the intended use of the copolymer. The molecular weight of the copolymer may range from about 12,000 to about 800,000, preferably from about 20,000 to about 100,000, and most preferably from about 30,000 to about 80,000. The aminoplast is a polymerizable resin of the general formula:

$$(RO)_{\overline{z}} Amp \qquad \text{VII.}$$

wherein z is a positive number having a value of at least 2. The ether containing two active hydrogen terminal groups comprises a wide variety of compositions. A preferred class of them is nonionic. Illustrative of a preferred class of such ethers are polyalkylene oxides of the formula:

$$H— Alkylene\ Oxide —H \qquad \text{VIII.}$$

where "alkylene oxide" is a divalent moiety containing at least two alkylene oxide units in which 1. the alkylene oxide units form a linear chain and provide a terminal OH, or
2. the alkylene oxide are bonded to a starter molecule, such as a diamine, urea, carbamate, phenoxy, amide, bisimide, and the like, and providing a terminal OH, and/or
3. in which alkylene oxide are bonded to a terminal group that possesses a moiety that provides the active hydrogen (—H in formula VIII).

Further illustrative of such a preferred class are the water dispersible polyether compounds of the formula:

$$H_{x1}X—(R_{04})_{x4}(R_{05})_{x5}(R_{06})_{x6}(R_{07})_{x7}(R_{08})_{x8}—XH_{x2} \qquad \text{IX.}$$

wherein

X is an active hydrogen-attached functional moiety such as oxy (—O—), sulfidyl (—S—), amino (—N<), carboxy (—COO—), carboxamido, silyl, phosphoryl, ureido, and the like;

$R_{04}$ and $R_{08}$ are alkyl of 2 to about 8 carbon atoms;

$R_{05}$ and $R_{07}$ are one or more alkylene oxide units, e.g., such as water dispersible ethylene oxide, propylene oxide, mixed ethylene oxide/1,2-propylene oxide, mixed ethylene oxide/1,3-propylene oxide, mixed ethylene oxide/1,2-butylene oxide, mixed ethylene oxide/1,4-butylene oxide, and the like;

$R_{06}$ is a divalent group such as alkyleneoxy, alkylenepolyamine, cycloalkylene polyamine, phenoxy, uriedo, carbamate, amide, and the like;

x1 and x2 are each equal to the free valence of X;

x3, x4, x5, x6 and x7 are each 0 or 1, and one or more of x4 and x6 is 1.

Specific illustrations of a limited class of polyethers encompassed by formula IX are the Carbowax® and Pluronic® polyether diols sold by Union Carbide Chemicals & Plastics, Inc. and BASF Wyandotte, respectively. There are a variety of functional fluids based on alkylene oxides that are sold by Union Carbide Chemicals & Plastics, Inc. and BASF Wyandotte that are encompassed by formula IX. The molecular weight of the polyether reagent may range from about 106 and lower, to about 35,000, and higher.

In the prior art, as noted above, aminoplasts are condensed with polyfunctional compounds to produce thermosetting resins or thermoset products (i.e., C-stage resin). The above method produces a linear copolymer. Thus, the copolymers of formulae I, II, III, IV, and V are either liquid or thermoplastic solids that are solvent soluble and water dispersible.

Aminoplast reagents include, but are not restricted to, aldehyde reaction products of melamines, ureas, benzoguanamines, glycolurils, and the like, to produce the array of aminoplasts, including but not limited to those described in FIG. 1 above. While any of these can be used to make associative thickeners, the glycolurils, such as those of formula X

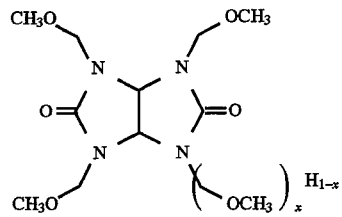

where R and x are defined above, have shown appropriate hydrolyric stability, when reacted with the polyether compounds, such as those encompassed by formula IX, to meet commercial criteria for associative thickener-containing coating compositions. However, the reaction products of such aminoplasts with, e.g., thiois and NH groups from amides and carbamates, encompassed by formula IX, are much more hydrolyrically stable than aminoplast ether linkages. The use of such reactants allow for the production of most hydrolytically stable aminoplast-based copolymers.

Suitable polyethers include such diverse polyalkylene polyethers as those having the formula:

FIG. 2. Partial list of polyalkylene polyethers

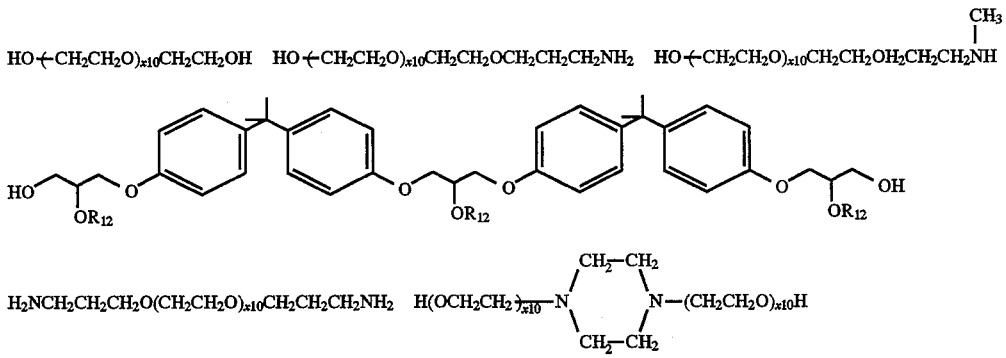

-continued
FIG. 2. Partial list of polyalkylene polyethers

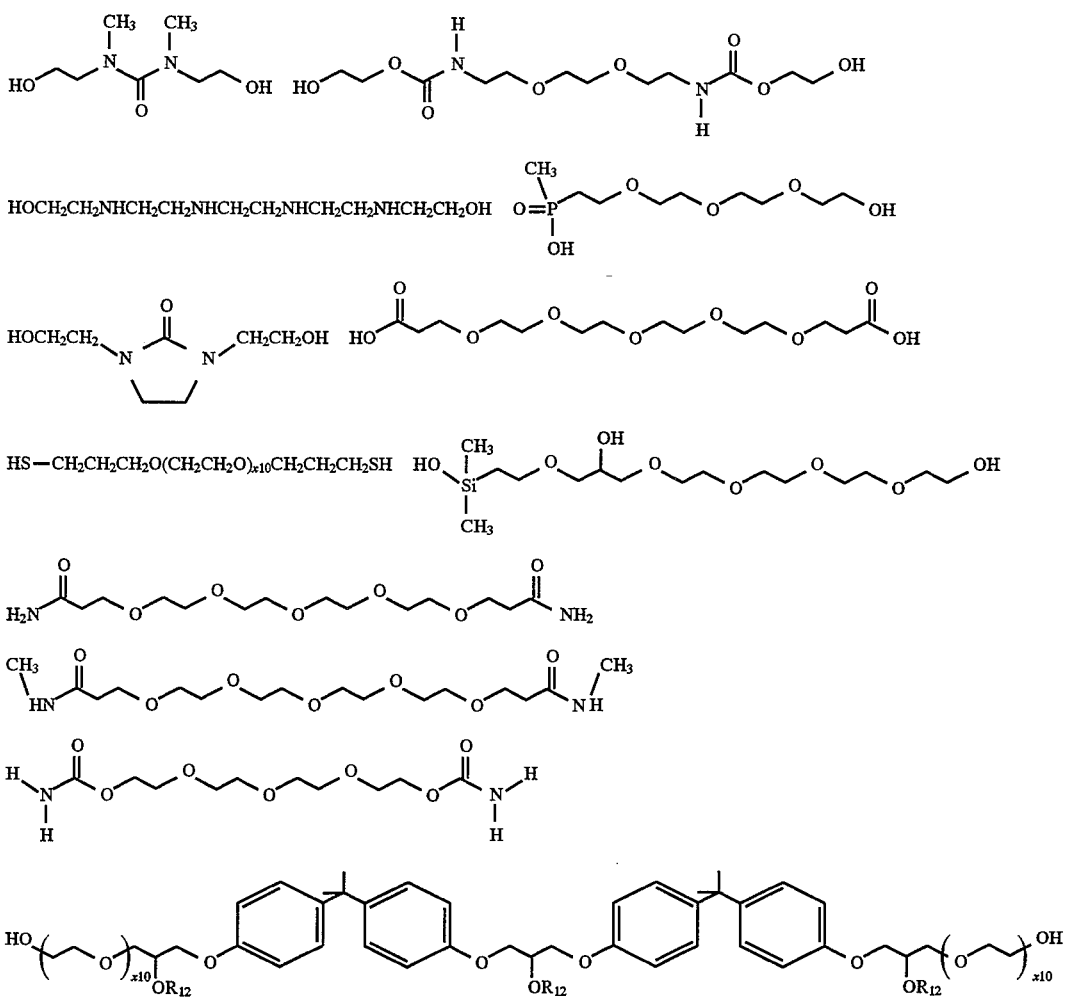

where x10 has a value of from about 1 to about 400, $R_{12}$ are alkyl of 1 to about 4 carbon atoms or acyl of 1 to about 3 carbon atoms. The preferred polyethers are water soluble. The most preferred polyethers are the alkylene polyethers where the predominant alkylene groups are ethylene. The most desirable polyethers are polyethylene oxide diols that possess molecular weights from about 1,000 to about 20,000.

Illustrative of the desirable polyethylene oxide diols are those of the formula:

HO—(—CH$_2$CH$_2$O)$_{x11}$CH$_2$CH$_2$OH   XI.

wherein x11 has a value of about 20 to about 500, preferably from about 50 to about 350, and most preferably from about 100 to about 250.

A further desirable embodiment of the invention is the modification of the linear aminoplast-ether copolymers used in making the coatings of the invention by including a minor mole proportion of the following unit structure in the repeating structure of the copolymer:

—AmP—R$_{15}$—   XII.

wherein $R_{15}$ is the residue of a diol possessing greater hydrophobicity than $R_{01}$, thereby providing for a linear copolymer containing the structure

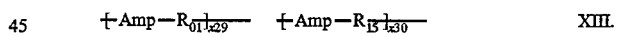   XIII.

wherein x29 has a value that is greater than x30. Preferably, x30/x29 is less than about 1, preferably less than about 0.33. Illustrative of such $R_{15}$ groups are

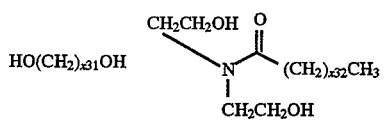

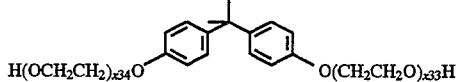

wherein x31 has a value of about 8 to about 20, x32 has a value of about 8 to about 23, x33 and x34 have values of 0 to about 8. The linear copolymer of formula XIII may be modified to possess the terminal groups of formulae Ia, IIa, IIIa, and IVa, discussed above.

The linear aminoplast-ether copolymers embraced by formulae I and XIII, may contain, as well, hydrophobe pendant groups. This is illustrated by the presence of significant hydrophobic groups extending from aminoplast component of the linear backbone of the aminoplast-ether copolymer. Such hydrophobe groups are typically bonded to the backbone through ether or ester groups, as illustrated in formula VI. The nature of the hydrophobe can enhance the performance of the resulting aminoplast-ether copolymer as an associative thickener in water-based coating compositions. Aromatic groups, e.g., phenyl, biphenyl, anthracyl, and the like, present in the hydrophobes are better than hydrophobes based on wholly aliphatic containing groups, especially for high shear viscosity attributes when used in water, and especially so with respect to the use of the associative thickeners in latex paints. Suitable hydrophobe groups are derived from alcohols, thiols, carboxylic acids, carboxamides, and carbamates of the formula:

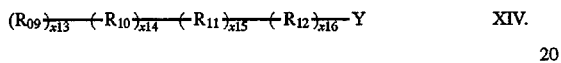
 XIV.

wherein $R_{09}$ is hydrogen, alkyl of 8 to about 24 carbon atoms, alkenyl of 8 to about 24 carbon atoms and alkynyl of 8 to about 24 carbon atoms, $R_{10}$ is mono, di and tri(aryl), $R_{11}$ is aryl, mono, di and tri(alkaryl), mono, di and tri (alkcycloalkyl), alkenyl and alkynyl where the alkyl, alkenyl and alkynyl contain 1 to about 24 carbon atoms and the cycloalkyl contains about 4 to about 8 carbon atoms, $R_{12}$ is one or more alkylene oxide, Y is an active hydrogen containing group such as OH, SH, COOH, $CONHR_{08}$, $NR_{09}COOH$, x13, x14, x15 and x16 are 0 or 1, and two or more of x13, x14, x15 and x16 have the value of 1 at the same time. Illustrative of such hydrophobe groups are the following precursor compounds from which the hydrophobe is derived:

CH$_3$(CH$_2$)$_{x17}$OH   CH$_3$(CH$_2$)$_{x17}$COOH

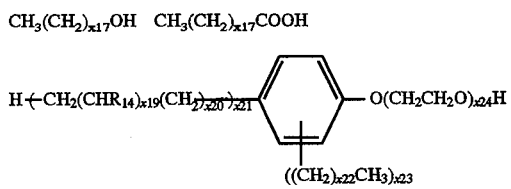

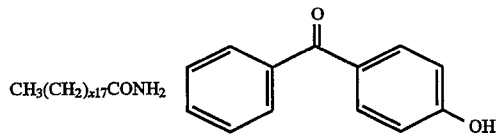

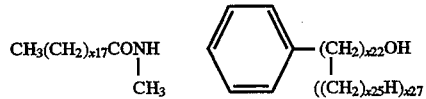

R$_{15}$CNH(CH$_2$)$_5$OH   CH$_3$(CH$_2$)$_{x17}$O(CH$_2$CH$_2$O)$_{x18}$H

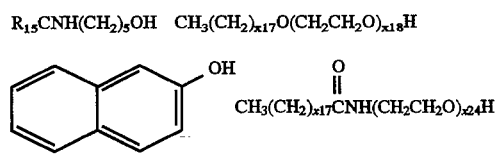

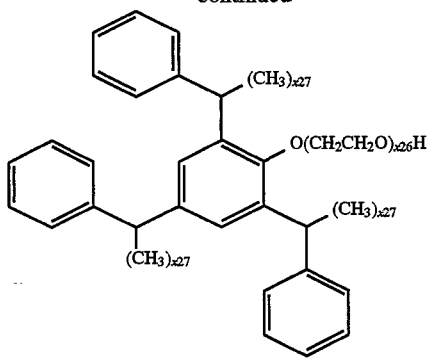

where the derived hydrophobe are

CH$_3$(CH$_2$)$_{x17}$O—   CH$_3$(CH$_2$)$_{x17}$COO—

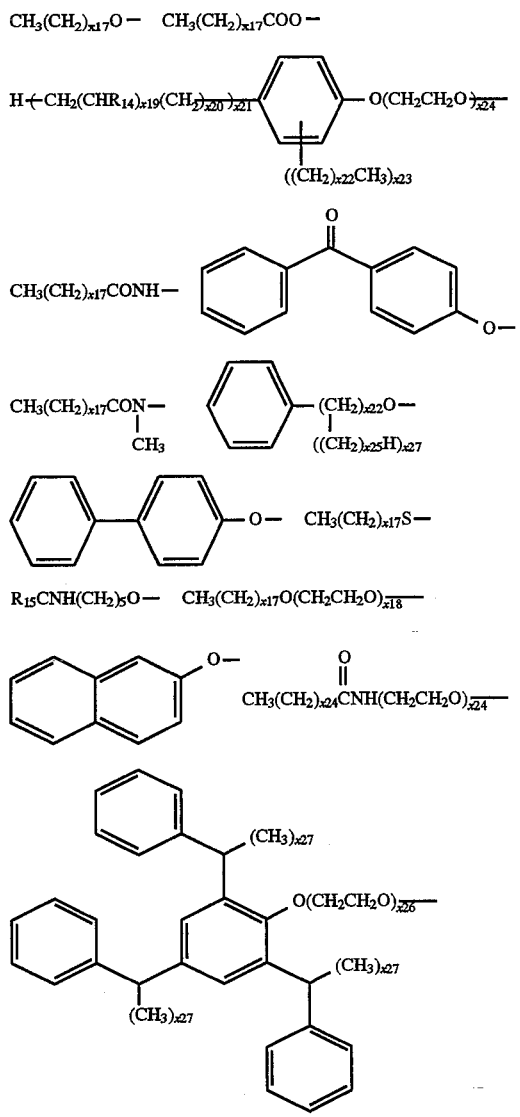

and in which $R_{10}$ is aryl, or alkyl of 8 to 24 carbon atoms, x15 has a value of 7 to 23, x16 has a value of 1 to about 20, x19 has a value of 0 to about 120, x26 has a value of about 8 to about 60, x17 has a value of about 7 about 23, x18 has a value of 1 to about 23, x20 is 0 or 1, x21 is 0 or 1, the sum of x20 and x21 is 1 or 2, x22 is 1 to about 20, x23 is 1 to about 20, x27 is 0 or 1, x24 has a value of about 8 to 23, and x25 has a value of about 8 to 20. Another class of such hydrophobes are based on partially saponified fatty acid glycerides such as partially saponified linseed oil, tall oil, cottonseed oil, caster oil, coconut oil, corn oil, oiticica oil, perilia oil, poppyseed oil, rapeseed oil, and the like. A further class of such hydrophobes are ethoxylates of such partially saponified fatty acid glycerides. Illustrative of such esters are

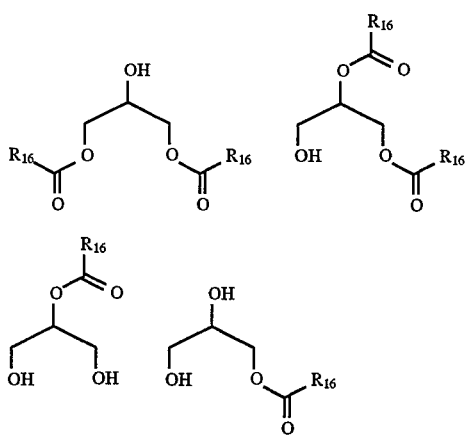

where $R_{16}$ are the hydrocarbyl portion of the natural fatty acid component of the fatty acid glycerides. Their ethoxylates are illustrated as

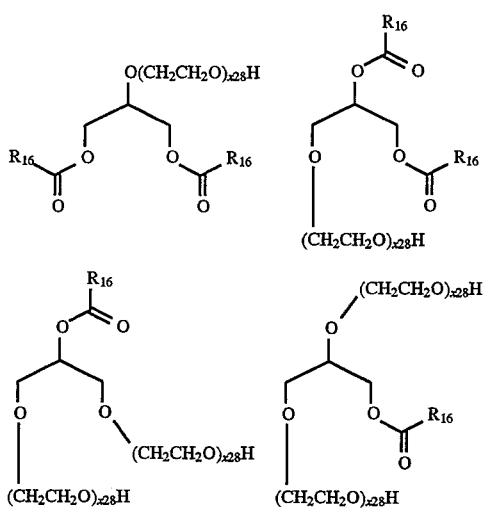

where x28 has a value of 1 to about 200, and $R_{16}$ are the natural fatty acid component of the natural oil.

The choice of hydrophobe is primarily dependent on the use ascribed for the associative thickener of the invention. For example, the copolymer without the hydrophobe provides wetting agent and viscosity control features in water and with water-based compositions. In the demanding area of water-based coatings, it is desirable to include a hydrophobe as a component of the aminoplast-ether copolymer of the invention. Any of the aforementioned hydrophobes will affect the viscosity of a latex paint giving rise to benefits to the paint. However, certain of the hydrophobes in combination with certain of the aminoplast-ether copolymers, provide associative thickeners that essentially satisfy the most demanding commercial standards. For example, the use of dodecylphenol ethoxylates as the hydrophobe achieves particularly desirable high shear viscosity characteristics, resistance to spatter and gloss retention in semi-gloss paints when compared to nonylphenol and octylphenol ethoxylates which have often been employed in making associative thickeners with urethane in the polymer backbone. It has also been observed that using tristyrylphenol ethoxylates improves the gloss of semi-gloss paints even further and provides better high shear resistance according to the ICI cone and plate viscometer reading in flat latex paints. Reacting Bisphenol A into the associative thickeners (to form the copolymer of formula XIII) reduces the syneresis common when using associative thickeners in concert with cellulosics.

This invention relates to the use of any aminoplast, including those specifically recited in FIG. 1 above, to make the copolymer of the invention. Of these aminoplasts, exceptional performing associative thickeners are obtained from the reaction of glycolurils with alkylene oxide glycols to which are incorporated hydrophobic pendant moieties.

The production of the aminoplast-ether copolymers are made by solvent or melt polymerization. The typical preparation of an aminoplast-, such as glycoluril-, based associative thickener involves dissolving the aminoplast (e.g., glycoluril), a polyether compounds within the scope of formula IX (such as a Carbowax® polyether sold by Union Carbide Chemical and Plastics, Inc., Danbury, Conn.), with or without the addition of a more hydrophobic polyol within the scope of formula XII, and an ethoxylated hydrophobe, in a stripping solvent, such as alkylated benzene (e.g., toluene or xylenes). Prior to the combination of these reagent, each may be dried by azeotropic distillation with toluene, xylenes, or a mixture of them, or by any other drying procedure. Total concentration of the reagents in the solvent may be maintained from about 10 to about 60 weight %. The temperature of the mixture may be brought to about 60°–140° C., preferably to about 80°–120° C. An acid catalyst, such as a sulfonic acid catalyst, is then added. The reaction mixture is placed under reduced pressure to bring about a steady distillation of the toluene/xylenes which azeotropes the alcohol byproduct that must be removed in order for the reaction to proceed. Fresh solvent is constantly added to maintain a constant level. The reaction is allowed to proceed until a given high viscosity is achieved as measured by Gardner bubble tubes or until viscosity increase ceases. Such viscosity increase indicates an increase in the molecular weight of the copolymer.

Specific Illustration of Solvent Process

1. Polyether polyol, hydrophobe and azeotroping solvent (e.g., toluene) are added to an appropriately sized container that accommodates a heater, temperature reading device, a nitrogen inlet, and a Dean Stark water trap and condenser.

2. The mixture of step 1 is heated to reflux to dry the mixture by azeotropic distillation. When water removal ceases, the mixture is cooled to about 100° C., and the water trap is removed. A distillation column and receiving vessel are installed in the container.

3. Glycoluril (e.g., Powderlink 1174) is added and allowed to melt.

4. The catalyst is added and vacuum is applied. The pressure is reduced to a level that causes a steady distillation of solvent at about 100° C. The solvent is continually replenished from a pressure equalizing add funnel.

5. As the reaction proceeds, samples are removed and cooled to room temperature, and the Gardner bubble viscosity is measured.

6. When the proper viscosity is reached, the heat is removed and the mixture is cooled in a water bath. When the temperature has been reduced to below 75° C., an amine neutralizing agent is added. When the temperature is reduced to below 65° C., the polymer solution is poured out onto trays to air dry.

7. The dried polymer is cut into strips and redissolved in water or water/cosolvent mixture.

Polymerization in the melt involves the admixture of the same reagents in the absence of a solvent with a heavy duty laboratory mixer (such as an Universal Sigma Blade Mixer, sold by Baker Perkins Guittard SA, Paris, France) at a temperature sufficient to generate leaving groups and remove the reaction condensation products. The ventilation of the reaction is necessary in order to shift the reaction to the right and prevent an equilibrium reaction from occurring that impedes the reaction before the desired degree of polymerization is achieved.

Catalysts useable for effecting the copolymerization reaction includes the standard Brönsted-Lowery acid catalysts typically used for the condensation of aminoplast resins. Such acid catalysts include mineral acids (e.g., HCl, $H_2SO_4$, $H_3PO_4$, and the like), aryl sulfonic and alkylated aryl sulfonic acids, such as benzene sulfonic acid, p-toluene sulfonic acid, 1-naphthalene sulfonic acid, 2-naphthalene sulfonic acid, naphthalene-1,5-disulfonic acid, naphthalene-2,7-disulfonic acid, 1,3,6-naphthalene trisulfonic acid, naphtholsulfonic acid, dinonylnaphthalene disulfonic acid, dodecylbenzene sulfonic acid, oxalic acid, maleic acid, hexamic acid, alkyl phosphate ester, phthalic acid, and copolymerized acrylic acid. Of these catalysts, the sulfonic acid catalysts are the most effective and efficient for making the copolymers of the invention and dodecylbenzene sulfonic acid is the most preferred sulfonic acid catalyst.

Glycolurils are marketed by Cytec Industries as Cymel 1170, 1171, 1175 and Powderlink 1174. The Cymel versions are either mixed methylolated species and typically contain a relatively high isomer content of up to about 20 weight percent. Powderlink 1174 is a purer form that is solely the methyl ester of the formula:

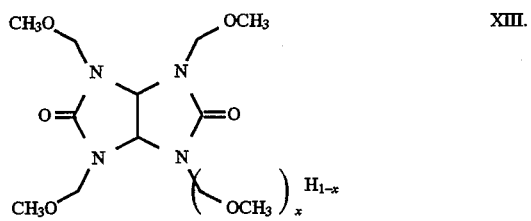   XIII.

with about 3-5 weight percent of a dimer-oligomer of the monomer form. The purer the monomeric form of the aminoplast, the better it is in forming the copolymers of the invention. In about 5-7 weight percent of Powderlink 1174, x is 0, and such monomer form is trifunctional. The dimer-oligomer forms provide greater amounts of methoxy per molecule. For example, the dimer contains 6 methoxy functional groups. Such tri- and hexa-functionality does not alter this invention. The glycoluril ether linkage is much more resistant to hydrolysis than other aminoplast ether bonds. The higher dimer-oligomer content of the less pure glycolurils is not as favored as the lower dimer-oligomer content of Powder link 1174.[1]

[1]Powderlink 1174 is called a "resin" and "crosslinker" by Cytec, and has been sold under the Cymel® name (i.e., Cymel 1174). Its empirical structure is $C_{12}H_{22}N_4O_6$. Its chemical name is Imidazo [4,5-D] imidazole-2,5 (1H,3H)-dione, tetrahydro-1,3,4,6-tetrakis (methoxymethyl)-. CAS 17464-88-9. It is also known by the following names: (i) Glycoluril, 1,3,4,6 tetrakis methoxymethyl, (ii) Glycoluril, tetrakis methoxymethyl, (iii) Glycoluril, N,N,N,N tetrakis methoxymethyl, (iv) Glyoxal diuriene, tetrakis methoxymethyl, and (v) Tetramethoxytetramethylol acetylenediurea. The favored name is (i) and such skeletal structure is called glycoluril.

The ratio of aminoplast resin to the difunctional polyether is not narrowly critical. Typically, either the aminoplast resin or the difunctional polyether may be used in molar excess or stoichiometrically equivalent amounts in making the linear copolymer of the invention. In characterizing stoichiometry of the aminoplast resin, the resin is treated as being difunctional since linearity, according to the invention, is achieved when the aminoplast resin functions as a difunctional monomer even though the resin has the capability of higher functionality, e.g., tri- and tetrafunctionality, as the case may be. Thus, more than one mole of a polyether diol to one mole of, e.g., a glycoluril such as Powderlink 1174, represents a stoichiometric excess of the polyether to the glycoluril. Using this characterization, one may use between 1-2 moles of one of these reagents to 1 mole of the other. Either the polyether or the aminoplast may be in excess. However, it is more typical to use a mole amount of one reagent of about 1-1.75 to 1 of the other reagent. Typically, one employs a molar excess of the aminoplast resin because one may incorporate more hydrophobicity into the copolymer this way. This is especially the case when the copolymer is dimeric to oligomeric (e.g., possessing less than about 15 repeating units). When making higher polymeric structures, one uses a greater proportion of the polyether reagent, up to a 1:1 mole ratio. In general, it is desirable to use a molar excess of aminoplast of about 1.001-1.5 moles to 1 mole of the difunctional polyether. The amount of monofunctional hydrophobe reagent, in the typical case, should not exceed about 2 moles, nor be less than about 0.001 mole, of the monofunctional hydrophobe per mole of reacted aminoplast resin in the copolymer of the invention. Usually, the amount of monofunctional hydrophobe ranges from about 1 mole to about 0.01 mole per mole of reacted aminoplast.

The use of aminoplast reagents leads to an unexpected degree of formulating latitude in polymer synthesis. By varying the ratios of polyether and hydrophobe components, it is possible to make a large number of associative thickener copolymers that impart ICI viscosity of 1.2 poise in flat paint at 4.5 lb. loading, but which give a range of 15,000 to 75,000 centipoise at low shear. This latitude permits the facile tailoring of associative thickeners for a wide variety of paint and nonpaint applications.

Waterborne coatings may be defined as coatings that contain water as the major volatile component and utilize water to dilute the coating to application consistency. These coatings consist mainly of resinous binder, pigments, water, and organic solvent. The type of pigmentation and the method of incorporation of the pigment vary widely.

Waterborne coatings can be made by dispersing, emulsifying or emulsion polymerizing the resin binder by use of added surfactants. This technique leads to opaque liquids. Because some hard resins are difficult or impossible to disperse directly into water, the resin sometimes can be dissolved in a water-immiscible solvent, and the resulting solution dispersed by the use of added surfactants. In this case, the solvent aids subsequent film coalescence. Surface activity or water dispersability also can be introduced into resin molecules by chemical modification of the resin by introducing functional polar groups such as the carboxyl group.

Some very finely dispersed resins appear as clear or slightly hazy liquids; they frequently are described as soluble, solubilized, colloidal dispersions, micro-emulsions, hydrosols, etc. These resins contain built-in functional groups that confer water "solubility" upon the resin, and, normally, external added surfactants are not used.

Waterborne resin binders can be classified as anionic, cationic, or non-ionic. Anionic dispersions are characterized by negative charges on the resin or by negative charges on the surfactant associated with the resin. Cationic dispersions have a positive charge on the resin or on the surfactant associated with the resin. Nonionic dispersions are those that have been dispersed by addition of nonionic surfactants or that contain a built-in hydrophilic segment such as polyethylene oxide which is part of the main chain of a relatively hydrophobic resin molecule.

The coating compositions may be of the thermosetting or thermoplastic varieties. The resin used in forming the coating may be insoluble in water, and the conversion of such a resin into a waterborne system typically involves converting the resin into an emulsion or dispersion. In the context of this invention, the waterborne composition contains the aminoplast-ether copolymer associative thickener of the invention.

The aqueous polymer dispersions may be prepared according to well known emulsion polymerization procedures, using one or more emulsifiers of an anionic, cationic, or nonionic type. Mixtures of two or more non-neutralizing emulsifiers regardless of type may be used. The amount of emulsifier may range from about 0.1 to 10% by weight or sometimes even more, based on the weight of the total monomer charge. In general, the molecular weight of these emulsion polymers is high, e.g., from about 100,000 to 10,000,000 number average molecular weight, most commonly above 500,000.

The water insoluble resin may be any of those known in the art, and may be a conventional natural or synthetic polymer latex emulsified with one of a nonionic, cationic or anionic surfactant. The primary resins are based on homopolymerized and copolymerized olefinic monomers such as vinyl acetate; vinyl chloride; styrene; butadiene; vinylidene chloride; acrylonitrile; methacrylonitrile; acrylic acid; methacrylic acid; alkyl acrylates; alkyl methacrylates; acrylamide; methacrylamide; hydroxyethyl methacrylate ("HEMA"); glycidyl methacrylate; dihydroxypropyl methacrylate; homopolymers of $C_2$–$C_{40}$ alpha-olefins such as ethylene, isobutylene, octene, nonene, and styrene, and the like; copolymers of one or more of these hydrocarbons with one or more esters, nitriles or amides of acrylic acid or of methacrylic acid or with vinyl esters, such as vinyl acetate and vinyl chloride, or with vinylidene chloride; and diene polymers, such as copolymers of butadiene with one or more of styrene, vinyl toluene, acrylonitrile, methacrylonitrile, and esters of acrylic acid or methacrylic acid, and the like. It is also quite common to include a small amount, such as 0.1 to 5% or more, of an acid monomer in the monomer mixture used for making the copolymers mentioned above by emulsion polymerization. Acids used include acrylic, methacrylic, itaconic, crotonic, maleic, fumaric, and the like.

The vinyl acetate copolymers are well-known and include copolymers such as vinyl acetate/butyl acrylate/2-ethylhexyl acrylate, vinyl acetate/butyl maleate, vinyl acetate/ethylene, vinyl acetate/vinyl chloride/butyl acrylate and vinyl acetate/ vinyl chloride/ethylene.

Other waterborne systems involve reactive copolymers that are crosslinked by the presence of complementary functional groups in the system. For example, a copolymer of acrylic ester/glycidylmethacrylate can be emulsified and crosslinked by the presence of a melamine-formaldehyde resin similarly emulsified in the system. In another system, a copolymer of HEMA and another acrylate, hydroxyl terminated polyesters, polyethers, or polyurethanes, can be emulsified and crosslinked by the presence of either an aminoplast resin, a polyisocyanate or blocked polyisocyanate.

The term "acrylic polymer" means any polymer wherein at least 50% by weight is an acrylic or methacrylic acid or ester, including mixtures of such acids and esters individually and together. The term "vinyl acetate polymer" means any polymer containing at least 50% by weight of vinyl acetate.

Even small particle size (about 0.1–0.15 micron) acrylic and other latices are thickened effectively, and flow and leveling improved, by thickeners of the invention.

The amount of the aminoplast-ether copolymer described herein that is employed in the coating composition of the invention is not narrowly critical. That amount will vary based on the resin system used, the water concentration, the amount of fillers and the choice of fillers, the presence or absence of thixotropic agents, and the like. Also, the amount of the copolymer will be based on how the copolymer is intended to be used in the formulation, e.g., used as a wetting agent or as a thickening agent. In that respect, the amount of the aminoplast-ether copolymer in the composition is sufficient to thicken the composition or the amount of the aminoplast-ether copolymer in the composition is sufficient to function as a wetting agent in or for the composition. However, in general, the amount of the copolymer will range from about 0.1 weight percent to about 15 weight percent, preferably from about 0.5 weight percent to about 10 weight percent, and most preferably from about 1 weight percent to about 8 weight percent, of the weight of the coating composition, exclusive of fillers, pigments and like additives.

EXAMPLE 1

Carbowax® 8000[2] (300 grams, 0.0357 moles), Igepal RC-620[3] (23.0 grams, 0.0338 moles), a mixture of dodecylphenolethoxylates, were combined with 1356 grams toluene in a 2 liter reaction vessel fitted with a Dean Stark water trap. The mixture was refluxed under nitrogen to remove water by azeotropic distillation. The Dean Stark trap was removed, and a distillation column was fitted to the flask. Powderlink 1174 (15.92 grams, 0.050 moles) was added and the temperature was raised to 100° C. and Nacure 5076[4] (1.38 grams) (dodecylbenzene sulfonic acid) was added. Vacuum was applied to reduce the pressure inside the vessel to approximately 510 mm Hg. At this pressure the toluene distilled at a slow, steady rate. The toluene was constantly replenished to maintain a constant solvent level. This proceeded for 125 minutes at which time the viscosity was "X" on the Gardner bubble scale. The copolymer solution was cooled to 70° C. and dimethylethanolamine (0.53 gram) was added to quench the acid. The copolymer solution was cooled further to 60° C. and then poured out onto trays to air dry. The dried polymer was cut into small pieces and was dissolved at 20% polymer solids in a 4/1 water-diethylene glycol monobutyl ether mixture.

[2]Poly(ethyleneoxy)glycol, M.W. 8,000. Sold by Union Carbide Chemicals and Plastics, Inc.
[3]Sold by Rhone-Poulenc, Surfactant & Specialties, Cranberry, N.J.
[4]Sold by King Industries, Norwalk, Conn.

EXAMPLE 2

Procedure For Making Associative Thickeners Without Solvent

Carbowax 8000 (2204 grams, 0.262 moles) Igepal RC620 (168.9 grams, 0.248 moles), and 500 grams of toluene were placed in a 12 liter vessel equipped with a Dean Stark water trap. The materials were heated to reflux to azeotrope off water. Once the mixture was dry the remainder of the toluene was removed with vacuum. Powderlink 1174 (117.0 grams, 0.367 moles) was added and allowed to melt out. After the Powderlink had melted the material in the vessel was transferred to a 5 liter sigma blade mixer preheated to 105° C. The mixer was turned to run at 20 rpm. Nacure 5076 catalyst (7.10 grams) was added and the top was placed on the mixer. Vacuum was applied (27/30 in. achieved) and held for 1.75 hours as the viscosity increased. When the material had become quite viscous the heat was removed and dimethylethanolamine (3.87 grams, 0.043 mole) in 10 grams of toluene was added and the mixture was allowed to stir for a further 30 minutes. Diethyleneglycol monobutyl ether (1850 grams) and aleionized water (7200 grams) were added and the mixture was allowed to stir until the material had dissolved. The resulting solution was filtered through a cone filter. Paint results are as follows:

| flat vinyl acrylic (formulation below): | | semi-gloss vinyl acrylic (formulation below): | |
| --- | --- | --- | --- |
| ICI: | 1.05 poise | ICI: | 0.90 poise |
| Stormer: | 104 KU | Stormer: | 78 KU |
| Brookfield: | 49,000 cps | Brookfield: | 8,000 cps |

EXAMPLE 3

Using the procedure of Example 1, with the indicated modifications, the following other aminoplast-ether copolymers were made:

Aminoplast-ether Copolymer Formulation

| Reagent | Concentration |
| --- | --- |
| Cymel 1171 (mixed ether glycoluril)[5] | 0.0628 moles |
| Carbowax 8000 | 0.0349 moles |
| Tergitol NP-10[6] | 0.0489 moles |
| p-Toluene sulfonic acid | 0.53 grams |
| toluene | 1412 grams |

[5]Cytec Industries, Inc.
[6]Ethoxylated nonyl phenol, sold by Union Carbide Chemical & Plastics, Inc.

Conditions: The maximum reaction temperature was 100° C. The reaction was carried out at atmospheric pressure (no vacuum pulled). The Gardner scale was used in monitoring viscosity.

| Reagent | Concentration |
| --- | --- |
| Cymel 303 (hexamethoxymethylmelamine)[7] | 0.070 moles |
| Carbowax 8000 | 0.047 moles |
| Tergitol NP-10 | 0.052 moles |
| p-Toluene sulfonic acid | 0.94 grams |
| toluene | 1,665 grams |

[7]Cytec Industries, Inc.

Conditions: The maximum reaction temperature was 100° C. The reaction was carried out at atmospheric pressure (no vacuum pulled). The Gardner scale was used in monitoring viscosity.

Evaluation In Semi-Gloss Latex Paint Formulation

The 20% solution of example 1 was evaluated in a semi-gloss trade paint formulation, which consisted of a 24.4% PVC system using UCAR 376 vinyl-acrylic latex with Ti-Pure R-900 $TiO_2$. Listed below are the rheological and application results for example 1 and two commercial nonionic associative thickeners.

| Associative Thickeners | Loading, active lbs/100 gallons | Brookfield cps @ 0.5 rpm | Stormer KU | ICI poise | Sag | 60° gloss |
| --- | --- | --- | --- | --- | --- | --- |
| Example 1 | 5.0 | 9,720 | 85 | 1.00 | 10.0 | 45 |
| Acrysol SCT-270[8] | 5.0 | 13,200 | 95 | 1.22 | 13.6 | 59 |
| Acrysol RM-825[9] | 5.0 | 2,640 | 85 | 1.14 | 6.8 | 37 |

[8]Rohm & Haas Company, Philadelphia, PA
[9]Rohm & Haas Company, Philadelphia, PA Evaluation In Flat Latex Paint Formulation

| Associative Thickeners | Loading, active lbs/100 gallons | Brookfield cps @ 0.5 rpm | Stormer KU | ICI poise | Spatter amount |
| --- | --- | --- | --- | --- | --- |
| Example 1 | 4.5 | 36,240 | 106 | 1.22 | trace |
| Acrysol SCT-270 | 4.5 | 59,600 | 118 | 1.40 | nil |
| Acrysol RM-825 | 4.5 | 10,000 | 95 | 1.25 | trace |

Procedure For Making and Testing Latex Paint Using Aminoplast Based Associative Thickeners The following are the two primary formulations for evaluating aminoplast based associative thickeners. One is of a flat vinyl acrylic and the other is a semi-gloss vinyl acrylic. Typically both formulations are made in 5 gallon batches that are split into pints after the grind and let-down stage, but prior to the addition of the premix which contains the associative thickener.

The premix is added while the paint is being well agitated to ensure that the associative thickener is well incorporated into the paint. The paint is then allowed to sit at rest for 60 minutes to allow the material to further equilibrate followed by rheological measurements which involve 1. viscosity measurement in Krebs Units (KU) on a Stormer viscometer (ASTM D 562-81)

2. high shear measurement in poise at 10,000 $s^{-1}$ on an ICI cone and plate viscometer (ASTM D 4287-83)

3. pH and temperature measurements are obtained.

The paints are maintained at room temperature (~23.5° C.) and are evaluated as above at 24 hours, 1 week, 1, 2, 3, 6, and 12 months with the following additions:

1. a syneresis measurement is obtained by determining the amount in millimeters of the clear liquid that may separate to the top of the paint 2. a low shear measurement is obtained in centipoise (cps) at 0.5 rpm on a Brookfield RVT viscometer (ASTM D 2196-86).

After the 24 hour rheological measurements the flat paints are evaluated for spatter resistance according to ASTM procedure D 4707-87 with the exception that the paints are rated by the amount of spatter produced from nil, trace, slight, definite and pronounced. After the 24 hour rheological measurements the semi-gloss paints are evaluated for gloss at 60° C. after 1 day and 1 week room temperature air dry of a 0.004 mil draw down. Also the semi-gloss paints are evaluated for sag and leveling according to ASTM procedures D 4400-84 and D 2801-69.

The hydrolytic stability of the associative thickeners are determined by subjecting the paints to an elevated temperature (48.9° C.) for 4 weeks with rheological measurements obtained at 1 week intervals. The associative thickeners are determined to be stable if the Stormer viscosity does not lose more than 10% of the initial value.

Procedure for Making Latex Paint

1. Add water (and propylene glycol for semi-gloss) to 5-gallon container, begin agitation on a Hockmeyer Model Lab 2 type disperser equipped with a 4 inch dispersing blade.

2. Add HEC for the flat formulation and let mix agitate 5 minutes at low speed (~1000 rpm).

3. Add dispersant and mix 5 minutes, add other additives and pigment(s) and grind at high speed (~2000 rpm) for the specified time.

4. For the semi-gloss formulation prepare a premix in a separate container consisting of the water, HEC and ammonia, ensuring that the HEC is well dispersed in the water prior to the addition of the ammonia.

5. Add remaining let-down ingredients and agitate for 40 minutes, check weight per gallon and pH, divide into pint containers.

|  | Flat vinyl acrylic | | |
|---|---|---|---|
|  | Supplier | Pounds | Gallons |
| Grind Stage | | | |
| Water |  | 170.94 | 20.52 |
| Cellosize ER-15K (HEC thickener) | Union Carbide | 1.00 | 0.09 |
|  | Mix HEC 5 minutes at low speed. | | |
| Tamol 731 (dispersant) | Rohm & Haas | 10.50 | 1.14 |
| Proxel GXL (preservative) | Zeneca Biocides | 1.00 | 0.10 |
| Colloids 643 (defoamer) | Rhone_Poulenc | 2.00 | 0.26 |
| AMP-95 (Co-dispersant) | Angus Chemical | 1.00 | 0.13 |
| Tergitol NP-10 (Nonionic surfactant) | Rohm & Haas | 1.00 | 0.11 |
| TI-Pure R-901 ($TiO_2$ Primary Hiding Pigment) | DuPont | 200.00 | 6.40 |
|  | Grind $TiO_2$ @ high speed 20 minutes | | |
| ASP-400 (Aluminum Silicate extender pigment) | Minerals & Chemicals | 125.0 | 5.82 |
| Duramite $CaCO_3$ (extender pigment) | Thompson, Weinman & Co. | 201.2 | 8.91 |
|  | Grind @ high speed 20 minutes | | |
|  | Record maximum grind temperature | | |
| Let Down | | | |
| Water |  | 50.00 | 6.00 |
| UCAR 376 (Vinyl-acrylic latex 55% solids) | Union Carbide | 271.5 | 30.00 |
| Texanol (Coalescing Agent) | Eastman Chemical | 7.90 | 1.00 |
| Ammonia (pH adjusting agent) | Aldrich | 1.00 | 0.12 |
| Sub total: |  | 1044.04 | |
|  | Mix at low speed 30 minutes | | |
|  | Weight/Gallon 12.95 | | |
|  | Record pH: | | |
|  | Remove and divide into pints (522 grams/pint) | | |
| Premix: | | | |
| Propylene glycol (freeze thaw agent) | Chemcentral | 18.60 | 2.15 |
| Water |  | 117.70 | 14.13 |
| Associative thickener at 20% solids | Example 1 above | 22.50 | 2.60 |
| Colloids 643 (defoamer) | Rhone-Poulenc | 4.00 | 0.52 |
| Total: |  | 1206.84 | 100.00 |
|  | Pigment volume concentration % 55.34 | | |
|  | Volume Solids % 38.19 | | |

| Semi-gloss vinyl acrylic | | | |
|---|---|---|---|
| | Supplier | Pounds | Gallons |
| Grind Stage | | | |
| Water | | 9.58 | 1.15 |
| Propylene glycol | Chemcentral | 60.00 | 6.94 |
| Tamol 731 (dispersant) | Rohm & Haas | 10.20 | 1.11 |
| Colloids 643 (defoamer) | Rhone Poulenc | 1.25 | 0.16 |
| Ti-Pure R-900 (TiO$_2$ Hiding Pigment) | DuPont | 255.00 | 7.66 |
| Grind TiO$_2$ @ high speed 30 minutes; record maximum grind temperature: | | | |
| Let Down | | | |
| Water | | 130.00 | 15.61 |
| Cellocize ER-15,000 (HEC thickener) | | 1.00 | 0.09 |
| Premix water and HEC, add ammonia, agitate 10 minutes | | | |
| UCAR 376 (Vinyl-acrylic latex 55% solids) | Union Carbide | 417.00 | 46.08 |
| Ammonia | | 2.00 | 0.24 |
| Texanol (Coalescing Agent) | Eastman Chemical | 11.50 | 1.45 |
| Triton GR-7M (Anionic surfactant) | Rohm & Haas | 1.00 | 0.12 |
| Colloids 643 (defoamer) | Rhone Poulenc | 1.25 | 0.16 |
| Nuosept 95 (biocide) | Huls America | 3.00 | 0.33 |
| Sub Total | | 902.78 | |
| Mix at low speed 30 minutes | | | |
| Premix: | | | |
| Water | | 129.80 | 15.58 |
| Triton × 114 (nonionic surfactant) | Rohm & Haas | 1.00 | 0.11 |
| Associative Thickener at 20% solids | Example 1 above | 25.00 | 2.89 |
| Coloids 643 (defoamer) | Rhone Poulenc | 2.50 | 0.33 |
| Total: | | 1061.08 | 100.00 |
| Pigment volume concentration %: 23.19 | | | |
| Volume solids %: 33.03 | | | |

We claim:

1. A water-containing coating composition comprising a major amount of a coating vehicle and a minor amount of a linear aminoplast-ether copolymer of the formula:

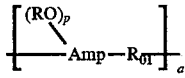

where the divalent $R_{01}$ contains a divalent alkyleneoxy containing moiety, Amp is the skeletal residue of an aminoplast, R is hydrogen, alkyl containing 1 to about 4 carbon atoms, or acyl containing 1 to about 4 carbon atoms, p is a positive number that is equal to the free valence of Amp minus 2, RO is bonded to alkylene units of Amp, and a is a number greater than 1.

2. The coating composition comprising the coating vehicle and the linear aminoplast-ether copolymer of claim 1 wherein a is a number greater than 2.

3. The coating composition comprising the coating vehicle and the linear aminoplast-ether copolymer of claim 1 wherein Amp includes any dimer and oligomer component of the aminoplast.

4. The coating composition comprising the coating vehicle and the linear aminoplast-ether copolymer of claim 1 wherein $R_{01}$ is derived from a water dispersible alkylene polyether.

5. The coating composition comprising the coating vehicle and the linear aminoplast-ether copolymer of claim 4 wherein $R_{01}$ is derived from a water soluble alkylene polyether.

6. The coating composition comprising the coating vehicle and the linear aminoplast-ether copolymer of claim 1 wherein the linear aminoplast-ether copolymer is water dispersible.

7. The coating composition comprising the coating vehicle and the linear aminoplast-ether copolymer of claim 2 wherein the linear aminoplast-ether copolymer is water dispersible.

8. The coating composition comprising the coating vehicle and the linear aminoplast-ether copolymer of claim 3 wherein the linear aminoplast-ether copolymer is water dispersible.

9. The coating composition comprising the coating vehicle and the linear aminoplast-ether copolymer of claim 4 wherein the linear aminoplast-ether copolymer is water dispersible.

10. The coating composition comprising a coating vehicle and a linear aminoplast-ether copolymer of claim 5 wherein the linear aminoplast-ether copolymer is water dispersible.

11. The coating composition comprising the coating vehicle and the linear aminoplast-ether copolymer of claim 6 wherein the linear aminoplast-ether copolymer is water soluble.

12. The coating composition comprising the coating vehicle and the linear aminoplast-ether copolymer of claim 7 wherein the linear amnioplast-ether copolymer is water soluble.

13. The coating composition comprising the coating vehicle and the linear aminoplast-ether copolymer of claim 8 wherein the linear aminoplast-ether copolymer is water soluble.

14. The coating composition comprising the coating vehicle and the linear aminoplast-ether copolymer of claim 9 wherein the linear aminoplast-ether copolymer is water soluble.

15. The coating composition comprising the coating vehicle and the linear aminoplast-ether copolymer of claim 10 wherein the linear aminoplast-ether copolymer is water soluble.

16. The coating composition comprising the coating vehicle and the linear aminoplast-ether copolymer of claim 1 wherein the linear aminoplast-ether copolymer contains one or more pendant groups.

17. The coating composition comprising the coating vehicle and the linear aminoplast-ether copolymer of claim 16 wherein the pendant groups are hydrophobic pendant groups.

18. A water-containing coating composition comprising a coating vehicle and a linear aminoplast-ether copolymer of the formula:

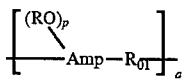

where the divalent $R_{01}$ contains a divalent alkyleneoxy containing moiety, Amp is the skeletal residue of an aminoplast, R is hydrogen, alkyl containing 1 to about 4 carbon atoms, or acyl containing 1 to about 4 carbon atoms, p is a positive number that is equal to the free valence of Amp minus 2, RO is bonded to alkylene units of Amp, a is a number greater than 1 and wherein the linear aminoplast-ether copolymer contains one or more hydrophobic pendant groups whereby the copolymer contains a unit of the formula:

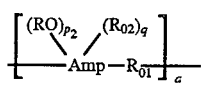

wherein $R_{02}$ is a hydrophobic group, different from RO—, that is covalently bonded to Amp through a heteroatom and contains at least two carbon atoms, $p_2$ is number that is equal to the free valence of Amp minus (2+q), and q is a positive number.

19. The coating composition comprising the coating vehicle and the linear aminoplast-ether copolymer of claim 18 wherein $R_{02}$ contains at least two sequential carbon atoms.

20. The coating composition comprising the coating vehicle and the linear aminoplast-ether copolymer of claim 19 wherein the ratio of q/a is at least about 0.01.

21. The coating composition comprising the coating vehicle and the linear aminoplast-ether copolymer of claim 18 wherein the ratio of q/a is at least about 0.01.

22. The coating composition comprising the coating vehicle and the linear aminoplast-ether copolymer of claim 1 wherein the linear aminoplast-ether copolymer comprises units of the formula:

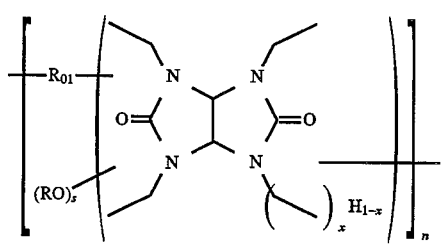

wherein n has a value of at least 2, x is 0 or 1, s is (3+x)−2, and the average value of x in the copolymer is about 0 to about 0.05.

23. The coating composition comprising the coating vehicle and the linear aminoplast-ether copolymer of claim 2 wherein the linear aminoplast-ether copolymer comprises units of the formula:

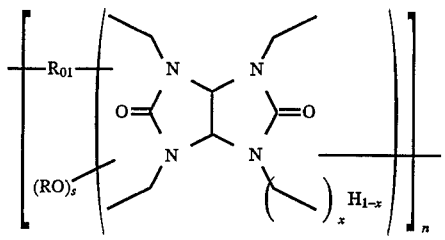

wherein n has a value of at least 2, x is 0 or 1, s is (3+x)−2, and the average value of x in the copolymer is about 0 to about 0.05.

24. The coating composition comprising the coating vehicle and the linear aminoplast-ether copolymer of claim 3 wherein the linear aminoplast-ether polymer comprises units of the formula:

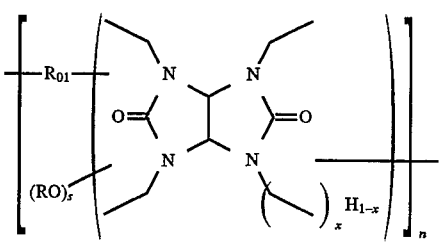

wherein n has a value of at least 2, x is 0 or 1, s is (3+x)−2, and the average value of x in the copolymer is about 0 to about 0.05.

25. The coating composition comprising the coating vehicle and the linear aminoplast-ether copolymer of claim 4 wherein the linear aminoplast-ether copolymer comprises units of the formula:

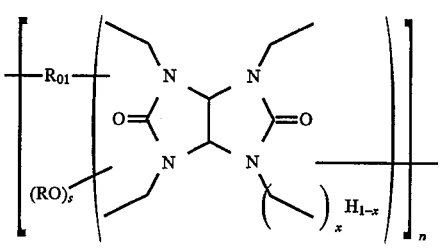

wherein n has a value of at least 2, x is 0 or 1, s is (3+x)−2, and the average value of x in the copolymer is about 0 to about 0.05.

26. The coating composition comprising the coating vehicle and the linear aminoplast-ether copolymer of claim 5 wherein the linear aminoplast-ether copolymer comprises units of the formula:

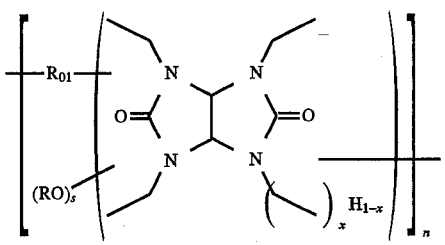

wherein n has a value of at least 2, x is 0 or 1, s is (3+x)−2, and the average value of x in the copolymer is about 0 to about 0.05.

27. The coating composition comprising the coating vehicle and the linear aminoplast-ether copolymer of claim 6 wherein the linear aminoplast-ether copolymer comprises units of the formula:

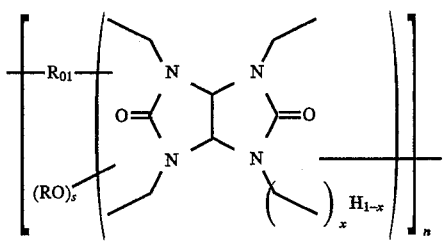

wherein n has a value of at least 2, x is 0 or 1, s is (3+x)−2, and the average value of x in the copolymer is about 0 to about 0.05.

28. The coating composition comprising the coating vehicle and the linear aminoplast-ether copolymer of claim 7 wherein the linear aminoplast-ether copolymer comprises units of the formula:

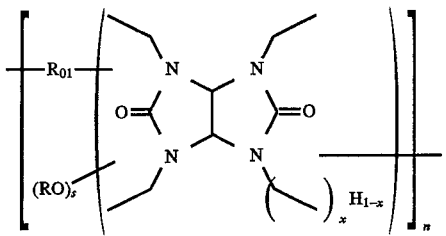

wherein n has a value of at least 2, x is 0 or 1, s is (3+x)−2, and the average value of x in the copolymer is about 0 to about 0.05.

29. The coating composition comprising the coating vehicle and the linear aminoplast-ether copolymer of claim 8 wherein the linear aminoplast-ether copolymer comprises units of the formula:

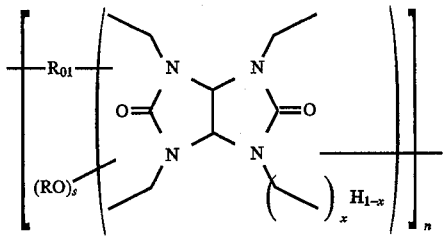

wherein n has a value of at least 2, x is 0 or 1, s is (3+x)−2, and the average value of x in the copolymer is about 0 to about 0.05.

30. The coating composition comprising the coating vehicle and the linear aminoplast-ether copolymer of claim 9 wherein the linear aminoplast-ether copolymer comprises units of the formula:

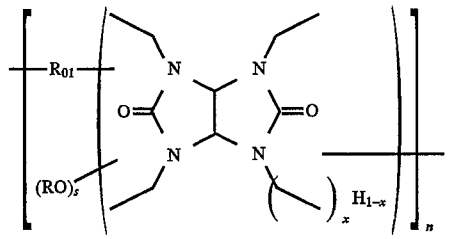

wherein n has a value of at least 2, x is 0 or 1, s is (3+x)−2, and the average value of x in the copolymer is about 0 to about 0.05.

31. The coating composition comprising the coating vehicle and the linear aminoplast-ether copolymer of claim 10 wherein the linear aminoplast-ether copolymer comprises units of the formula:

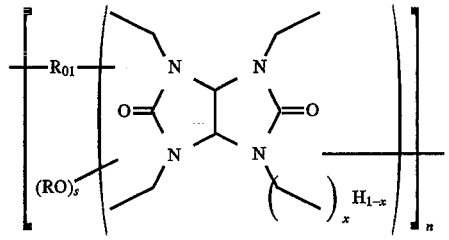

wherein n has a value of at least 2, x is 0 or 1, s is (3+x)−2, and the average value of x in the copolymer is about 0 to about 0.05.

32. The coating composition comprising the coating vehicle and the linear aminoplast-ether copolymer of claim 11 wherein the linear aminoplast-ether copolymer comprising units of the formula:

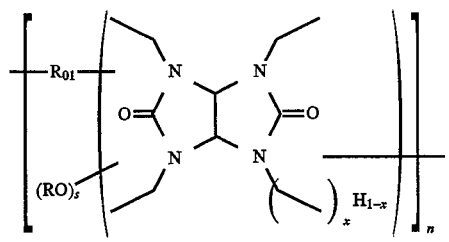

wherein n has a value of at least 2, x is 0 or 1, s is (3+x)−2, and the average value of x in the copolymer is about 0 to about 0.05.

33. The coating composition comprising the coating vehicle and the linear aminoplast-ether copolymer of claim 12 wherein the linear aminoplast-ether copolymer comprises units of the formula:

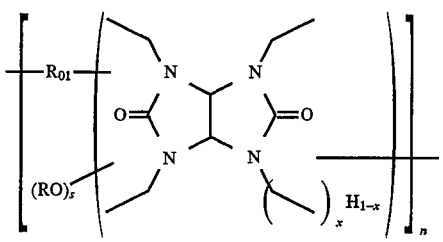

wherein n has a value of at least 2, x is 0 or 1, s is (3+x)−2, and the average value of x in the copolymer is about 0 to about 0.05.

34. The coating composition comprising the coating vehicle and the linear aminoplast-ether copolymer of claim 13 wherein the linear aminoplast-ether copolymer comprises units of the formula:

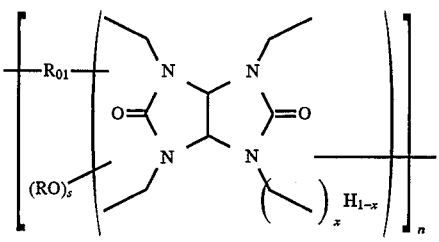

wherein n has a value of at least 2, x is 0 or 1, s is (3+x)−2, and the average value of x in the copolymer is about 0 to about 0.05.

35. The coating composition comprising the coating vehicle and the linear aminoplast-ether copolymer of claim 14 wherein the linear aminoplast-ether copolymer comprises units of the formula:

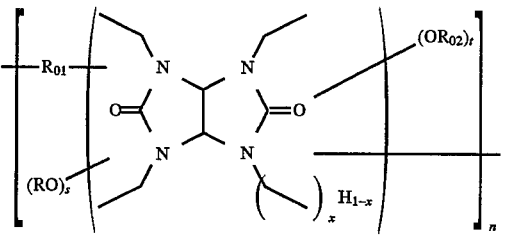

wherein n has a value of at least 2, x is 0 or 1, s is (3+x)−2, and the average value of x in the copolymer is about 0 to about 0.05.

36. The coating composition comprising the coating vehicle and the linear aminoplast-ether copolymer of claim 15 wherein the linear aminoplast-ether copolymer comprises units of the formula:

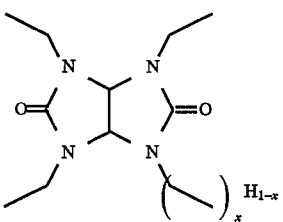

wherein n has a value of at least 2, x is 0 or 1, s is (3+x)−2, and the average value of x in the copolymer is about 0 to about 0.05.

37. The coating composition comprising the coating vehicle and the linear aminoplast-ether copolymer of claim 16 wherein the linear aminoplast-ether copolymer comprises units of the formula:

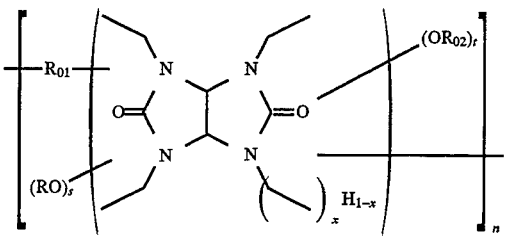

wherein n has a value of at least 2, x is 0 or 1, s is (3+x)−2, and the average value of x in the copolymer is about 0 to about 0.05.

38. The coating composition comprising the coating vehicle and the linear aminoplast-ether copolymer of claim 17 wherein the linear aminoplast-ether copolymer comprises units of the formula:

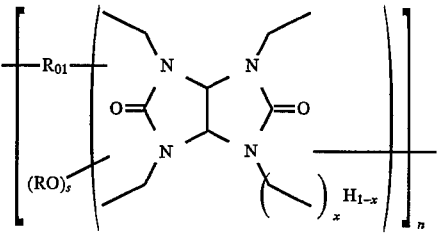

wherein n has a value of at least 2, x is 0 or 1, s is (3+x)−2, and the average value of x in the copolymer is about 0 to about 0.05.

39. The coating composition comprising the coating vehicle and the linear aminoplast-ether copolymer of claim 22 wherein the copolymer has the formula:

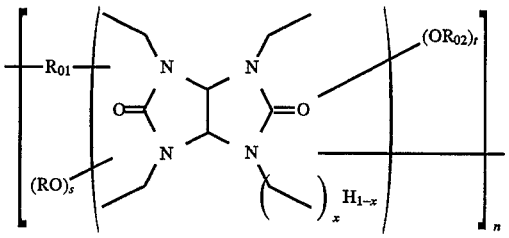

where $R_{O2}$ is a hydrophobic group, different from RO—, that is covalently bonded to Amp through a heteroatom and contains at least two carbon atoms and s+t equals (i) the free valence of the

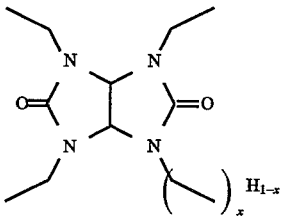

moiety and (ii) 4−x; and the average value of t/s+t is about 0.01 to about 0.5.

40. The coating composition comprising the coating vehicle and the linear aminoplast-ether copolymer of claim 23 wherein the copolymer has the formula:

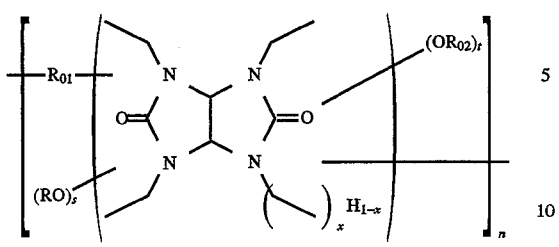

where $R_{O2}$ is a hydrophobic group, different from RO—, that is covalently bonded to Amp through a heteroatom and contains at least two carbon atoms and s+t equals (i) the free valence of the

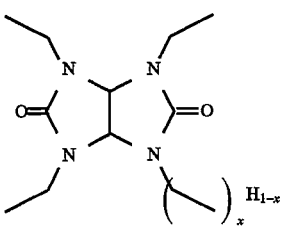

moiety and (ii) 4–x; and the average value of t/s+t is about 0.01 to about 0.5.

41. The coating composition comprising the coating vehicle and the linear aminoplast-ether copolymer of claim 24 wherein the copolymer has the formula:

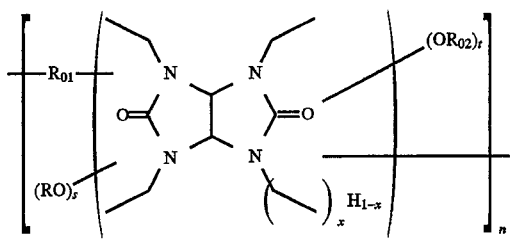

where $R_{O2}$ is a hydrophobic group, different from RO—, that is covalently bonded to Amp through a heteroatom and contains at least two carbon atoms and s+t equals (i) the free valence of the

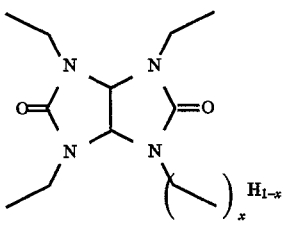

moiety and (ii) 4–x; and the average value of t/s+t is about 0.01 to about 0.5.

42. The coating composition comprising the coating vehicle and the linear aminoplast-ether copolymer of claim 25 wherein the copolymer has the formula:

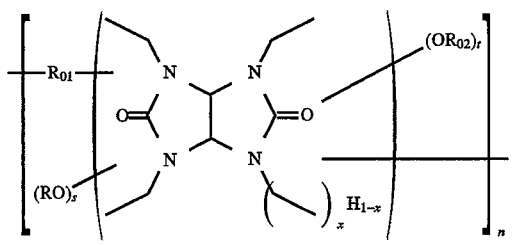

where $R_{O2}$ is a hydrophobic group, different from RO—, that is covalently bonded to Amp through a heteroatom and contains at least two carbon atoms and s+t equals (i) the free valence of the

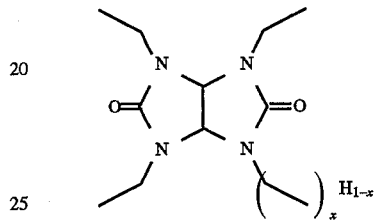

moiety and (ii) 4–x; and the average value of t/s+t is about 0.01 to about 0.5.

43. The coating composition comprising the coating vehicle and the linear aminoplast-ether copolymer of claim 26 wherein the copolymer has the formula:

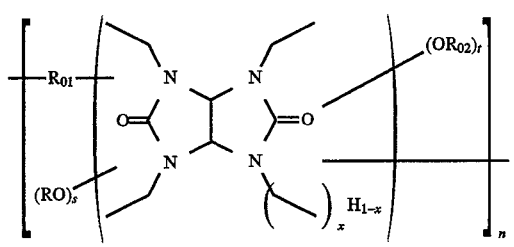

where $R_{O2}$ is a hydrophobic group, different from RO—, that is convalently Amp through a heteroatom and contains at least two carbon atoms and s+t equals (i) the free valence of the

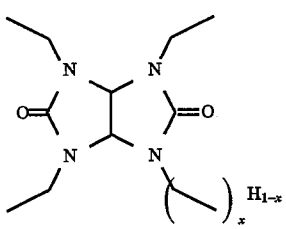

moiety and (ii) 4–x; and the average value of t/s+t is about 0.01 to about 0.5.

44. The coating composition comprising the coating vehicle and the linear aminoplast-ether copolymer of claim 27 wherein the copolymer has the formula:

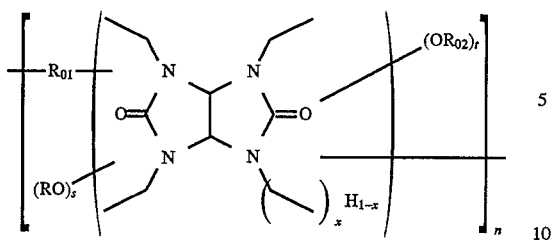

where $R_{O2}$ is a hydrophobic group, different from RO—, that is covalently bonded to Amp through a heteroatom and contains at least two carbon atoms and s+t equals (i) the free valence of the

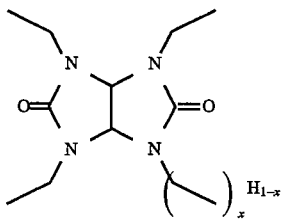

moiety and (ii) 4–x; and the average value of t/s+t is about 0.01 to about 0.5.

45. The coating composition comprising the coating vehicle and the linear aminoplast-ether copolymer of claim 28 wherein the copolymer has the formula:

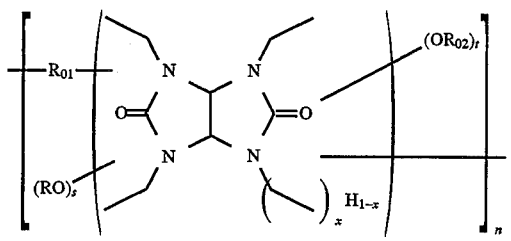

where $R_{O2}$ is a hydrophobic group, different from RO—, that is covalently bonded to Amp through a heteroatom and contains at least two carbon atoms and s+t equals (i) the free valence of the formula:

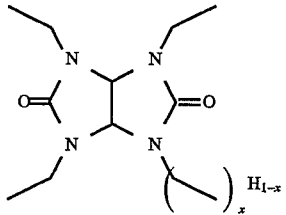

moiety and (ii) 4–x; and the average value of t/s+t is about 0.01 to about 0.5.

46. The coating composition comprising the coating vehicle and the linear aminoplast-ether copolymer of claim 29 wherein the copolymer has the formula:

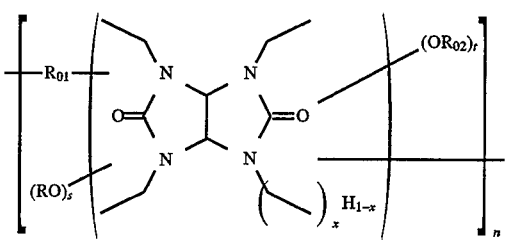

where $R_{O2}$ is a hydrophobic group, different from RO—, that is covalently bonded to Amp through a heteroatom and contains at least two carbon atoms and s+t equals (i) the free valence of the

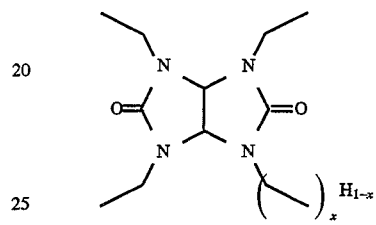

moiety and (ii) 4–x; and the average value of t/s+t is about 0.01 to about 0.5.

47. The coating composition comprising the coating vehicle and the linear aminoplast-ether copolymer of claim 30 wherein the copolymer has the formula:

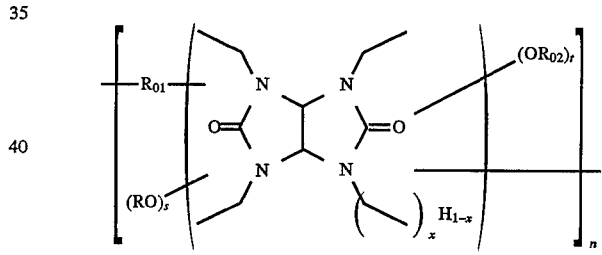

where $R_{O2}$ is a hydrophobic group, different from RO—, that is covalently bonded to Amp through a heteroatom and contains at least two carbon atoms and s+t equals (i) the free valence of the

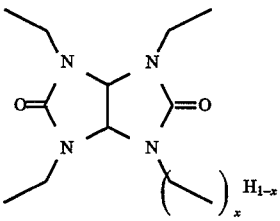

moiety and (ii) 4–x; and the average value of t/s+t is about 0.01 to about 0.5.

48. The coating composition comprising the coating vehicle and the linear aminoplast-ether copolymer of claim 31 wherein the copolymer has the formula:

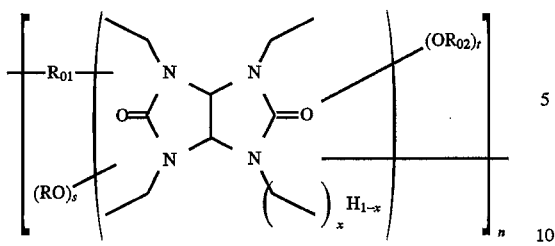

where $R_{O2}$ is a hydrophobic group, different from RO—, that is covalently bonded to Amp through a heteroatom and contains at least two carbon atoms and s+t equals (i) the free valence of the

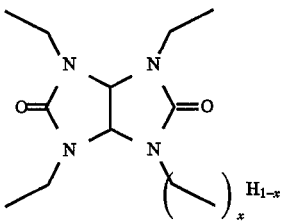

moiety and (ii) 4−x; and the average value of t/s+t is about 0.01 to about 0.5.

49. The coating composition comprising the coating vehicle and the linear aminoplast-ether copolymer of claim 32 wherein the copolymer has the formula:

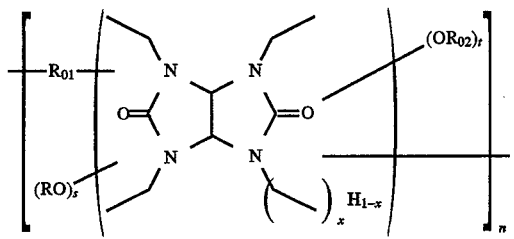

where $R_{O2}$ is a hydrophobic group, different from RO—, that is covalently bonded to Amp through a heteroatom and contains at least two carbon atoms and s+t equals (i) the free valence of the

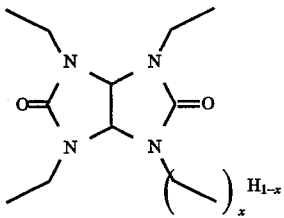

moiety and (ii) 4−x; and the average value of t/s+t is about 0.01 to about 0.5.

50. The coating composition comprising the coating vehicle and the linear aminoplast-ether copolymer of claim 33 wherein the copolymer has the formula:

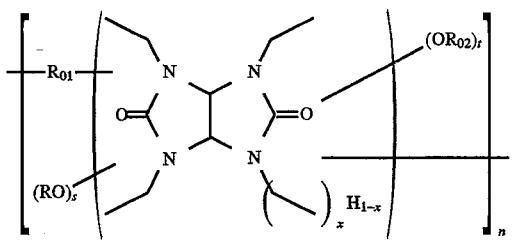

where $R_{O2}$ is a hydrophobic group, different from RO—, that is covalently bonded to Amp through a heteroatom and contains at least two carbon atoms and s+t equals (i) the free valence of the

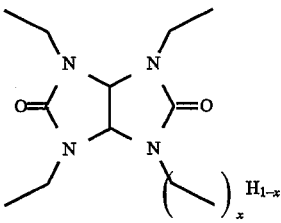

moiety and (ii) 4−x; and the average value of t/s+t is about 0.01 to about 0.5.

51. The coating composition comprising the coating vehicle and the linear aminoplast-ether copolymer of claim 34 wherein the copolymer has the formula:

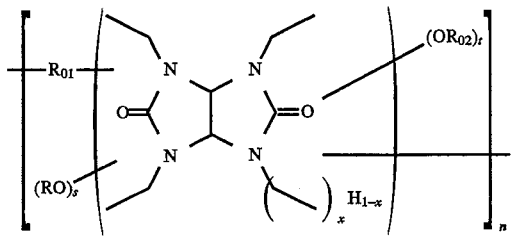

where $R_{O2}$ is a hydrophobic group, different from RO—, that is covalently bonded to Amp through a heteroatom and contains at least two carbon atoms and s+t equals (i) the free valence of the

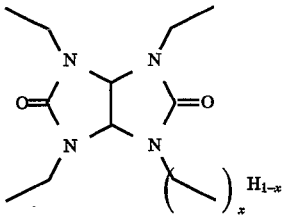

moiety and (ii) 4−x; and the average value of t/s+t is about 0.01 to about 0.5.

52. The coating composition comprising the coating vehicle and the linear aminoplast-ether copolymer of claim 35 wherein the copolymer has the formula:

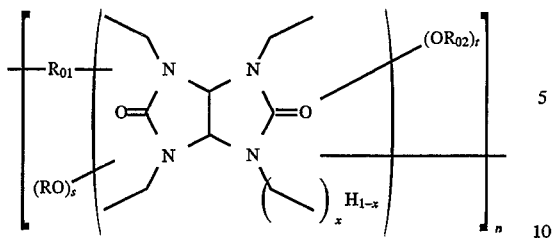

where $R_{02}$ is a hydrophobic group, different from RO—, that is covalently bonded to Amp through a heteroatom and contains at least two carbon atoms and s+t equals (i) the free valence of the

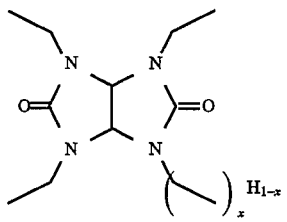

moiety and (ii) 4–x; and the average value of t/s+t is about 0.01 to about 0.5.

53. The coating composition comprising the coating vehicle and the linear aminoplast-ether copolymer of claim 36 wherein the copolymer has the formula:

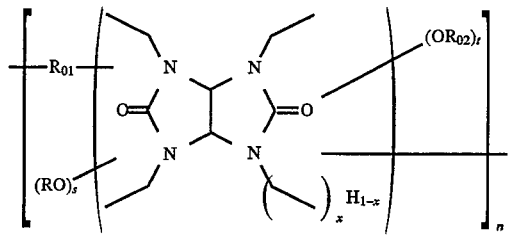

where $R_{02}$ is a hydrophobic group, different from RO—, that is covalently bonded to Amp through a heteroatom and contains at least two carbon atoms and s+t equals (i) the free valence of the

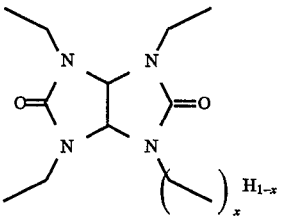

moiety and (ii) 4–x; and the average value of t/s+t is about 0.01 to about 0.5.

54. The coating composition comprising the coating vehicle and the linear aminoplast-ether copolymer of claim 37 wherein the copolymer has the formula:

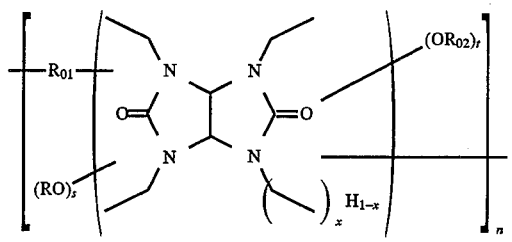

where $R_{02}$ is a hydrophobic group, different from RO—, that is covalently bonded to Amp through a heteroatom and contains at least two carbon atoms and s+t equals (i) the free valence of the

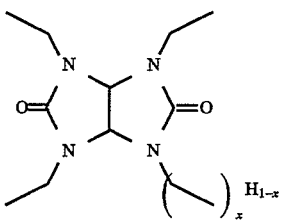

moiety and (ii) 4–x; and the average value of t/s+t is about 0.01 to about 0.5.

55. The coating composition comprising the coating vehicle and the linear aminoplast-ether copolymer of claim 38 wherein the copolymer has the formula:

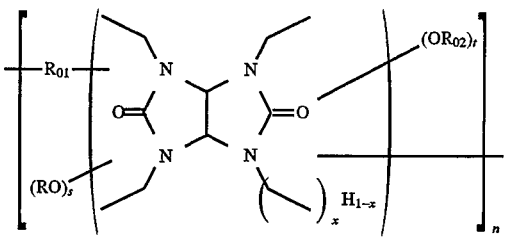

where $R_{02}$ is a hydrophobic group, different from RO—, that is covalently bonded to Amp through a heteroatom and contains at least two carbon atoms and s+t equals (i) the free valence of the

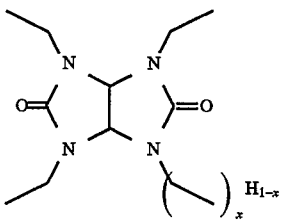

moiety and (ii) 4–x; and the average value of t/s+t is about 0.01 to about 0.5.

56. The coating composition comprising the coating vehicle and the linear aminoplast-ether copolymer of claim 39 wherein the copolymer has the formula:

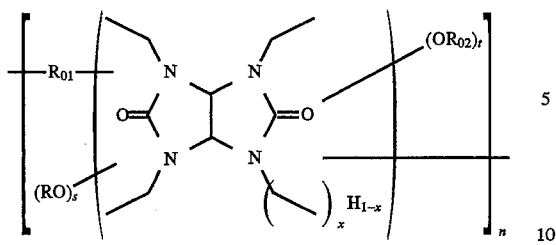

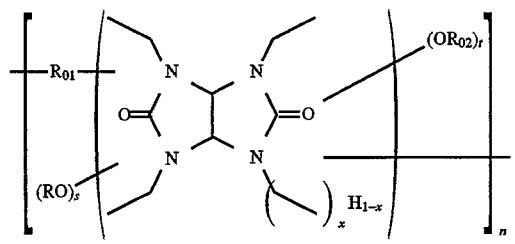

where $R_{O2}$ is a hydrophobic group, different from RO—, that is covalently bonded to Amp through a heteroatom and contains at least two carbon atoms and s+t equals (i) the free valence of the where $R_{O2}$ is a hydrophobic group, different from RO—, that is covalently bonded to Amp through a heteroatom and contains at least two carbon atoms and s+t equals (i) the free valence of the

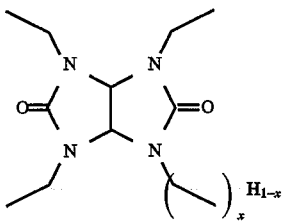

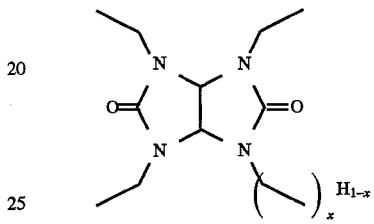

moiety and (ii) 4−x; and the average value of t/s+t is about 0.01 to about 0.5.

moiety and (ii) 4−x; and the average value of t/s+t is about 0.01 to about 0.5.

57. The coating composition comprising the coating vehicle and the linear aminoplast-ether copolymer of claim 40 wherein the copolymer has the formula:

59. The coating composition comprising the coating vehicle and the linear aminoplast-ether copolymer of claim 42 wherein the copolymer has the formula:

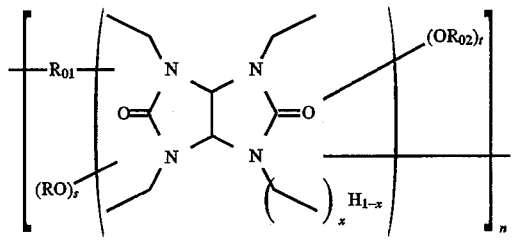

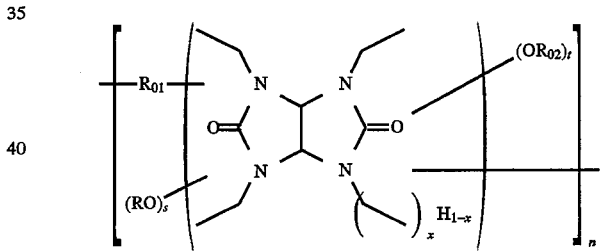

where $R_{O2}$ is a hydrophobic group, different from RO—, that is covalently bonded to Amp through a heteroatom and contains at least two carbon atoms and s+t equals (i) the free valence of the where $R_{O2}$ is a hydrophobic group, different from RO—, that is covalently bonded to Amp through a heteroatom and contains at least two carbon atoms and s+t equals (i) the free valence of the

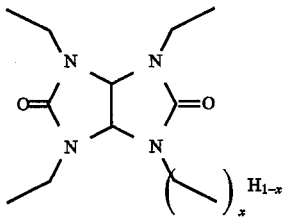

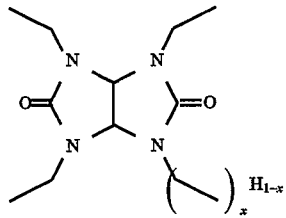

moiety and (ii) 4−x; and the average value of t/s+t is about 0.01 to about 0.5.

moiety and (ii) 4−x; and the average value of t/s+t is about 0.01 to about 0.5.

58. The coating composition comprising the coating vehicle and the linear aminoplast-ether copolymer of claim 41 wherein the copolymer has the formula:

60. The coating composition comprising the coating vehicle and the linear aminoplast-ether copolymer of claim 43 wherein the copolymer has the formula:

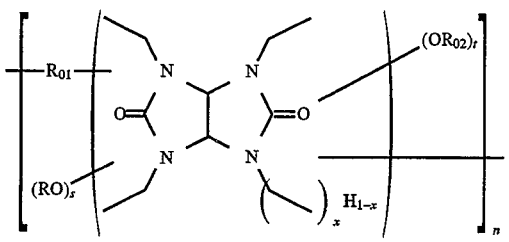

where $R_{O2}$ is a hydrophobic group, different from RO—, that is covalently bonded to Amp through a heteroatom and contains at least two carbon atoms and s+t equals (i) the free valence of the

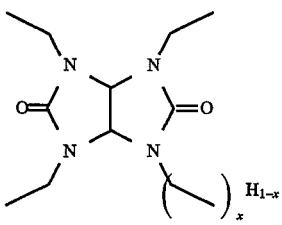

moiety and (ii) 4–x; and the average value of t/s+t is about 0.01 to about 0.5.

61. The coating composition comprising the coating vehicle and the linear aminoplast-ether copolymer of claim 1 wherein the copolymer possesses end groups characterized by a component of the units making up the copolymer, or a monofunctional group that effectively end-caps the copolymer, forming the end group.

62. The coating composition comprising the coating vehicle and the linear aminoplast-ether copolymer of claim 61 wherein the copolymer has the formula:

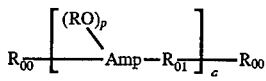

wherein each $R_{OO}$ is the same or different terminal group.

63. The coating composition comprising the coating vehicle and the linear aminoplast-ether copolymer of claim 62 wherein the copolymer has the formula:

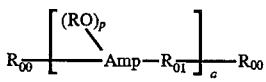

wherein each $R_{OO}$ is one or more of hydrogen, —$R_{o1}$—H, Amp bonded —(OR)$_{p1}$,—Amp—(OR)$_{p1}$, and another monofunctional organic group, and $p_1$ is a positive number that is equal to the free valence of Amp minus 1.

64. The coating composition comprising the coating vehicle and the linear aminoplast-ether copolymer of claim 62 wherein the other monofunctional group is one or more of alkyl, cycloalkyl, aryl, alkaryl, aralkyl, alkyoxyalkyl, aroxyalkyl and cycloalkoxyalkyl.

65. The coating composition comprising the coating vehicle and the linear aminoplast-ether copolymer of claim 63 wherein the copolymer has the formula:

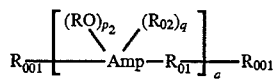

where each $R_{OO1}$ is the same or different, and is $R_{OO}$ or $R_{O2}$; $R_{O2}$ is a hydrophobic group, different from RO—, that is covalently bonded to Amp through a heteroatom and contains at least two carbon atoms.

66. The coating composition comprising a coating vehicle and a linear aminoplast-ether copolymer of claim 63 wherein the copolymer has the formula:

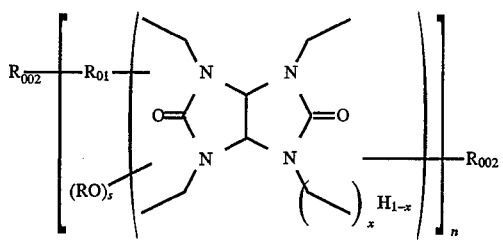

wherein each $R_{OO2}$ is the same or different terminal group selected from the group consisting of hydrogen, —$R_{o1}$—H, —(OR)$_{p1}$, —Amp°—(OR)$_{p1}$, and another monofunctional organic groups, $p_1$ is a positive number that is equal to the free valence of Amp° minus 1 and Amp° is

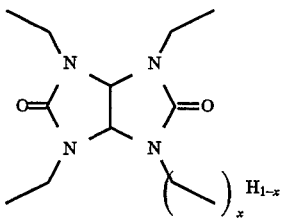

and x is 0 or 1.

67. The coating composition comprising the coating vehicle and the linear aminoplast-ether copolymer of claim 66 wherein the other monofunctional organic group is one or more of alkyl, cycloalkyl, aryl, alkaryl, aralkyl, alkyoxyalkyl, aroxyalkyl, and cycloalkoxyalkyl.

68. A coating composition comprising a major amount of a coating vehicle and a minor amount of the linear copolymerization reaction product of a polyfunctional aminoplast with a polyalkylene oxide of the formula:

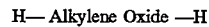

H— Alkylene Oxide —H where "alkylene oxide" is a divalent moiety containing at least two alkylene oxide units whether joined or separated, and the terminal H groups are active hydrogen, in the presence of an acid catalyst provided in a catalytically effective amount.

69. The coating composition comprising the coating vehicle and the copolymerization reaction product of claim 68 wherein the aminoplast is one or more selected from aldehyde reaction products of melamines, ureas, benzoguanamines and gycolurils.

70. The coating composition comprising the coating vehicle and the copolymerization reaction product of claim 69 wherein the aminoplast is a glycoluril.

71. The coating composition comprising the coating vehicle and the copolymerization reaction product of claim 70 wherein the aminoplast is the glycoluril of the formula:

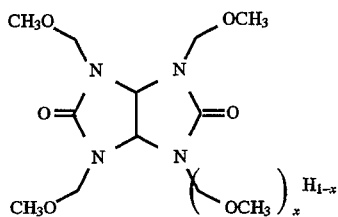

where R is hydrogen, alkyl containing 1 to about 4 carbon atoms, and acyl containing 1 to about 4 carbon atoms, and x is 0 or 1.

72. The coating composition comprising the coating vehicle and the copolymerization reaction product of claim 69 wherein the amninoplast is a melamine-aldehyde reaction product.

73. The coating composition comprising the coating vehicle and the copolymerization reaction product of claim 69 wherein the aminoplast is a urea-aldehyde reaction product.

74. The coating composition comprising the coating vehicle and the copolymerization reaction produce of claim 69 wherein the aminoplast is a benzoguanamine-aldehyde reaction product.

75. The coating composition comprising the coating vehicle and the copolymerization reaction product of claim 69 wherein the polyalkylene oxide has the formula:

$$\text{HO}-(-\text{CH}_2\text{CH}_2\text{O})_{x11}\text{CH}_2\text{CH}_2\text{OH} \quad \text{XI.}$$

wherein x11 has a value of about 20 to about 500.

76. The coating composition comprising the coating vehicle and the copolymerization reaction product of claim 75 wherein x11 has a value of about 50 to about 350.

77. The coating composition comprising the coating vehicle and the copolymerization reaction product of claim 76 wherein x11 has a value of about 100 to about 250.

78. The coating composition comprising the coating vehicle and a linear aminoplast-ether copolymer of claim 1 wherein the copolymer includes a minor mole proportion in the repeating structure of the copolymer of the unit structure:

$$-\text{Amp}-\text{R}_{13}- \quad \text{XII.}$$

wherein $R_{13}$ is the residue of a diol possessing greater hydrophobicity than $R_{01}$, thereby providing for a linear copolymer containing the structure $$+\text{Amp}-\text{R}_{01}\text{)}_{x29}- \quad +\text{Amp}-\text{R}_{13}\text{)}_{x30}- \quad \text{XIII.}$$

wherein x29 has a value that is greater than x30.

79. The coating composition comprising the coating vehicle and the linear aminoplast-ether copolymer of claim 78 wherein x30/x29 is less than about 1.

80. The coating composition comprising the coating vehicle and the linear aminoplast-ether copolymer of claim 79 wherein x30/x29 is less than about 0.33.

81. The coating composition comprising the coating vehicle and the linear aminoplast-ether copolymer of claim 78 wherein $R_{13}$ is the residue of a diol selected from the group consisting of

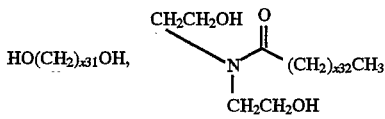

and

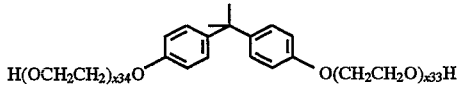

wherein x31 has a value of about 8 to about 20, x32 has a value of about 8 to about 23, x33 and x34 have values of 0 to about 8.

82. The coating composition comprising the coating vehicle and the linear aminoplast-ether copolymer of claim 68 wherein the copolymer contains hydrophobe pendant groups.

83. The coating composition comprising the coating vehicle and the linear aminoplast-ether copolymer of claim 84 wherein the hydrophobe pendant groups extend from the aminoplast component of the linear backbone of the aminoplast-ether copolymer.

84. The coating composition comprising the coating vehicle and the linear aminoplast-ether copolymer of claim 83 wherein the hydrophobe groups are derived from alcohols, thiols, carboxylic acids, carboxamides, and carbamates.

85. The coating composition comprising the coating vehicle and the linear amninoplast-ether copolymer of claim 83 wherein the hydrophobe groups are derived from compounds of the formula:

$$(R_{09})_{x13}-(R_{10})_{x14}-(R_{11})_{x15}-(R_{12})_{x16}-Y \quad \text{XIV.}$$

wherein $R_{09}$ is hydrogen, alkyl of 8 to about 24 carbon atoms, alkenyl of 8 to about 24 carbon atoms and alkynyl of 8 to about 24 carbon atoms, $R_{10}$ is mono, di and tri(aryl), $R_{11}$ is aryl, mono, di and tri(alkaryl), mono, di and tri (alkcycloalky), alkenyl and alkynyl where the alkyl, alkenyl and alkynyl contain 1 to about 24 carbon atoms and the cycloalkyl contains about 4 to about 8 carbon atoms, $R_{12}$ is one or more alkylene oxide, Y is an active hydrogen containing group, x13, x14, x15 and x16 are 0 or 1, and two or more of x13, x14, x15 and x16 have the value of 1 at the same time.

86. The coating composition comprising the coating vehicle and the linear aminoplast-ether copolymer of claim 83 wherein the hydrophobe groups are one or more structures of the formulae:

$$CH_3(CH_2)_{x17}O- \quad CH_3(CH_2)_{x17}COO-$$

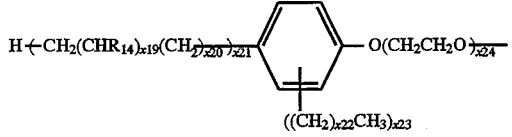

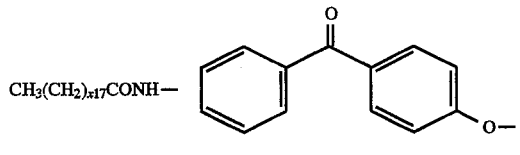

47
-continued

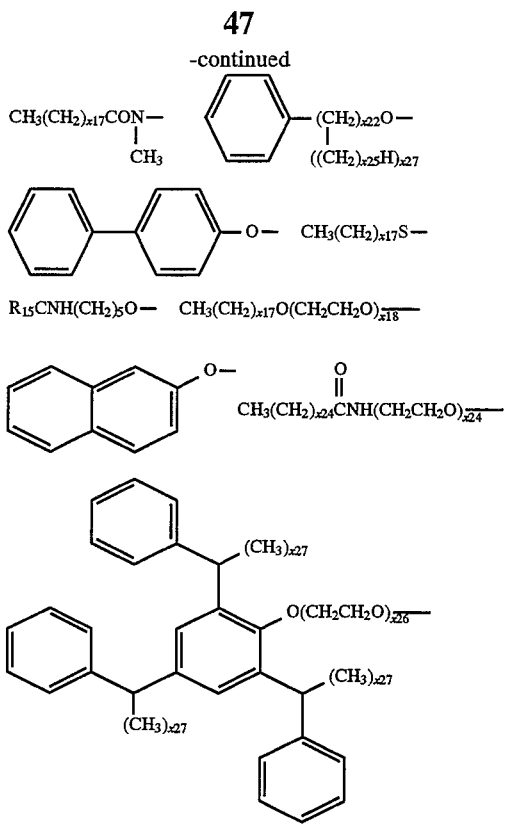

and in which $R_{14}$ is hydrogen or alkyl of 1 to about 12 carbon atoms, $R_{15}$ is aryl or alkyl of 8 to 24 carbon atoms, x17 has a value of 7 to 23, x18 has a value of I to about 20, x19 has a value of 0 to about 8, x20 is 0 or 1, x21 is 0 or 1, x22 has a value of 1 to about 20, x23 has a value of 1 to about 23, x24 has a value of 0 to about 120, x25 has a value of 1 to about 20, x26 has a value of about 8 to about 60, and x27 is 0 or 1, the sum of x19 and x20 is 1 to about 23, and the sum of x22 and x25 is 1 to about 20.

87. The coating composition comprising the coating vehicle and the linear aminoplast-ether copolymer of claim 83 wherein the hydrophobe groups are based on partially saponified fatty acid glycerides.

88. The coating composition comprising a coating vehicle and a linear aminoplast-ether copolymer of claim 87 wherein the partially saponified fatty acid glycerides based hydrophobe groups are derived from partially saponified linseed oil, tall oil, cottonseed oil, castor oil, coconut oil, corn oil, oiticica oil, perilia oil, poppyseed oil, rapeseed oil.

89. The coating composition comprising the coating vehicle and the linear aminoplast-ether copolymer of claim 87 wherein the hydrophobe groups have one or more of the formulae:

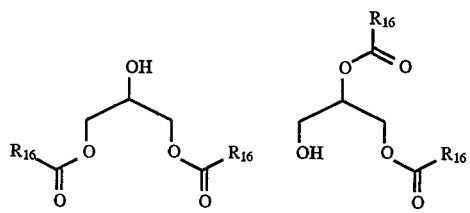

XV.

48
-continued

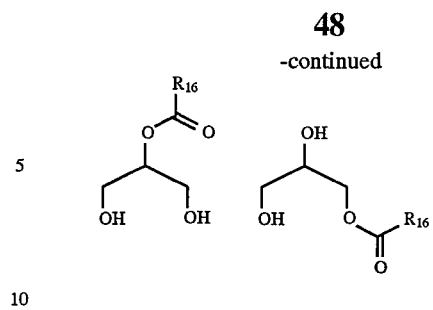

where $R_{16}$ are the hydrocarbyl portion of the natural fatty acid component of the fatty acid glycerides.

90. The coating composition comprising the coating vehicle and the linear aminoplast-ether copolymer of claim 87 wherein the hydrophobe groups are ethoxylates of such glycerides having one or more of the formulae:

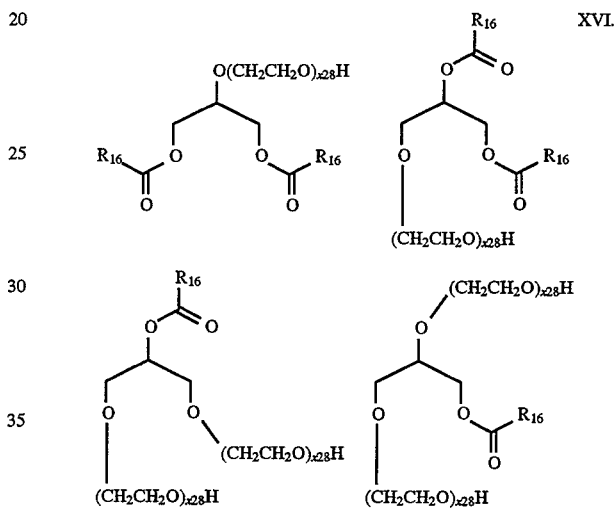

XVI.

where x28 has a value of 1 to about 200, and $R_{16}$ are the fatty acid component of the glyceride.

91. The coating composition comprising the coating vehicle and the linear aminoplast-ether copolymer of claim 68 wherein the polyfunctional aminoplast is one or more of the aminoplasts of the formulae:

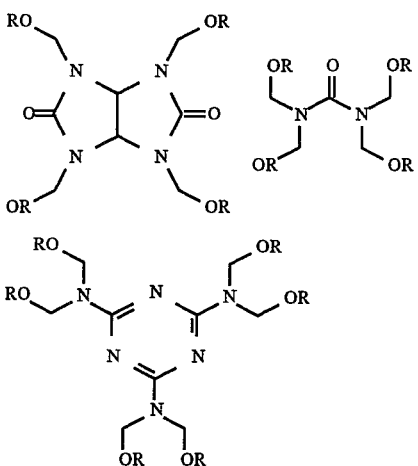

49
-continued

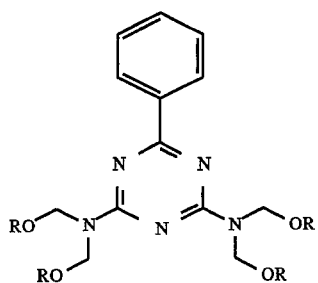
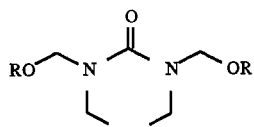
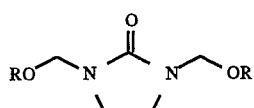
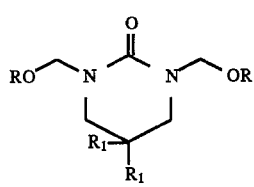
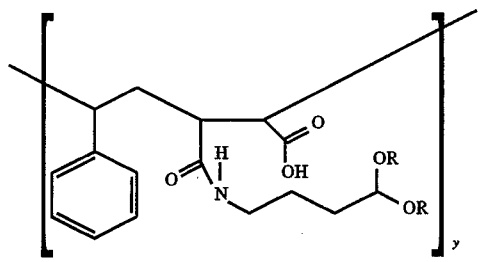
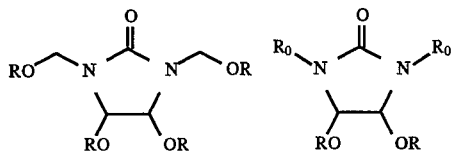
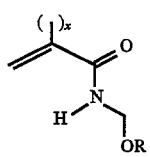
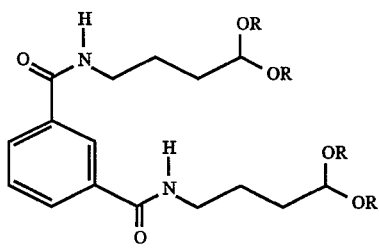

50
-continued

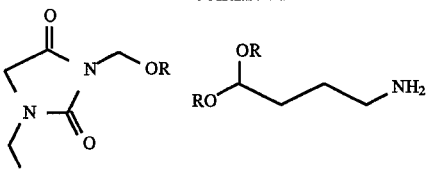
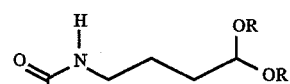
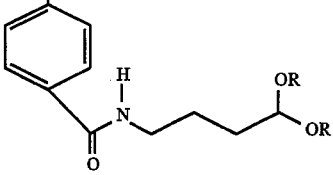

wherein R is hydrogen, alkyl containing 1 to about 4 carbon atoms, and acyl containing 1 to about 4 carbon atoms; $R_0$ is alkyl of from 1 to about 4 carbon atoms, aryl, cycloalkyl, and the like; $R_1$ is alkyl of from 1 to about 4 carbon atoms; and x is 0 or 1, and y is at least 2.

92. The coating composition comprising the coating vehicle and the linear aminoplast-ether copolymer of claim 68 wherein the polyether compound is a polyethylene oxide diol that is a water dispersible polyether compound of the formula:

$$H_{x1}X-(R_{04})_{x4}(R_{05})_{x5}(R_{06})_{x6}(R_{07})_{x7}(R_{08})_{x8}-XH_{x2} \qquad IX.$$

wherein

X is an active hydrogen-attached functional moiety selected from the group consisting of oxy (—O—), sulfidyl (—S—), amino (>N—), carboxy (—COO—), carboxamido, silyl, phosphoryl, and ureido;

$R_{04}$ and $R_{08}$ are alkyl of 2 to about 8 carbon atoms;

$R_{05}$ and $R_{07}$ are one or more alkylene oxide units selected from the group consisting of water dispersible ethylene oxide, propylene oxide, mixed ethylene oxide/1,2-propylene oxide, mixed ethylene oxide/1,3-propylene oxide, mixed ethylene oxide/1,2-butylene oxide, and mixed ethylene oxide/1,4-butylene oxide;

$R_{06}$ is a divalent group selected from the group consisting of alkyleneoxy, alkylenepolyamine, cydoalkylene polyamine, phenoxy, uriedo, carbamate, and amide;

x1 and x2 are each equal to the free valence of X;

x3, x4, x5, x6 and x7 are each 0 or 1, and one or more of x4 and x6 is 1.

93. The coating composition comprising the coating vehicle and the linear aminoplast-ether copolymer of claim 71 wherein the polyether compound is a polyethylene oxide diol that is a water dispersible polyether compound of the formula:

$$H_{x1}X-(R_{04})_{x4}(R_{05})_{x5}(R_{06})_{x6}(R_{07})_{x7}(R_{08})_{x8}-XH_{x2} \qquad IX.$$

wherein

X is an active hydrogen-attached functional moiety from the group consisting of oxy (—O—), sulfidyl (—S—), amino (>N—), carboxy (—COO—), carboxamido, silyl, phosphoryl, and ureido;

$R_{04}$ and $R_{08}$ are alkyl of 2 to about 8 carbon atoms;

$R_{05}$ and $R_{07}$ are one or more alkylene oxide units from the group consisting of water dispersible ethylene oxide, propylene oxide, mixed ethylene oxide/1,2-propylene oxide, mixed ethylene oxide/1,3-propylene oxide, mixed ethylene oxide/1,2-butylene oxide, and mixed ethylene oxide/1,4-butylene oxide;

$R_{06}$ is a divalent group from the group consisting of alkyleneoxy, alkylenepolyamine, cycloalkylene polyamine, phenoxy, uriedo, carbamate, and amide;

x1 and x2 are each equal to the free valence of X;

x3, x4, x5, x6 and x7 are each 0 or 1, and one or more of x4 and x6 is 1.

94. The coating composition comprising the coating vehicle and the linear aminoplast-ether copolymer of claim 1 wherein the polyether compound is a polyethylene oxide diol that possess molecular weights from about 1,000 to about 20,000.

95. The coating composition comprising the coating vehicle and the linear aminoplast-ether copolymer of claim 6 wherein the polyether compound is a polyethylene oxide diol that possess molecular weights from about 1,000 to about 20,000.

96. The coating composition comprising the coating vehicle and the linear aminoplast-ether copolymer of claim 18 wherein the polyether compound is a polyethylene oxide diol that possess molecular weights from about 1,000 to about 20,000.

97. The coating composition comprising the coating vehicle and the linear aminoplast-ether copolymer of claim 22 wherein the polyether compound is a polyethylene oxide diol that possess molecular weights from about 1,000 to about 20,000.

98. The coating composition comprising the coating vehicle and the linear aminoplast-ether copolymer of claim 68 wherein the polyalkylene oxide is a polyethylene oxide diol that possess molecular weights from about 1,000 to about 20,000.

99. The coating composition comprising the coating vehicle and the linear aminoplast-ether copolymer of claim 71 wherein the polyalkylene oxide is a polyethylene oxide diol that possess molecular weights from about 1,000 to about 20,000.

100. The coating composition comprising the coating vehicle and the linear aminoplast-ether copolymer of claim 78 wherein the polyether compound is a polyethylene oxide diol that possess molecular weights from about 1,000 to about 20,000.

101. A coating composition containing a vehicle and a linear aminoplast-ether copolymer made by the polymerization reaction of a polyfunctional aminoplast with an ether containing two active hydrogen terminal groups, in the presence of an acid catalyst provided in catalytically effective amounts until a desired molecular weight is achieved.

102. The coating composition of claim 101 wherein the molecular weight of the copolymer ranges from about 12,000 to about 300,000.

103. The coating composition of claim 102 wherein the molecular weight of the copolymer ranges from about 20,000 to about 100,000.

104. The coating composition of claim 103 wherein the molecular weight of the copolymer ranges from about 30,000 to about 80,000.

105. The coating composition of claim 101 where in the acid catalyst is a Brönsted-Lowery acid.

106. The coating composition of claim 105 wherein the acid catalyst is a sulfonic acid.

107. The coating composition of claim 106 wherein the aminoplast is a glycoluril of the formula:

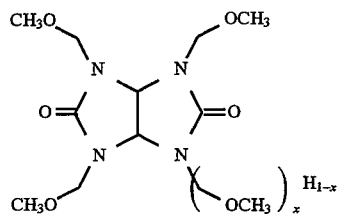

where R is hydrogen, alkyl containing 1 to about 4 carbon atoms, and acyl containing 1 to about 4 carbon atoms, and x is 0 or 1.

108. The coating composition of claim 107 wherein the polyethylene oxide diol has a molecular weight of about 8,000.

109. The coating composition of claim 108 wherein the acid catalyst is dodecylbenzene sulfonic acid.

110. The coating composition of claim 107 wherein the acid catalyst is dodecylbenzene sulfonic acid.

111. The coating composition of claim 107 wherein there is included a monofunctional hydrophobic reagent.

112. The coating composition of claim 111 wherein the monofunctional hydrophobic reagent is one of an alcohol, thiol, carboxylic acid, carboxamide, and carbamate of the formula:

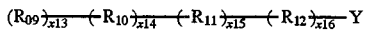

$$(R_{09})_{x13}-(R_{10})_{x14}-(R_{11})_{x15}-(R_{12})_{x16}-Y$$

wherein $R_{09}$ is hydrogen, alkyl of 8 to about 24 carbon atoms, alkenyl of 8 to about 24 carbon atoms and alkynyl of 8 to about 24 carbon atoms, $R_{10}$ is mono, di and tri(aryl), $R_{11}$ is aryl, mono, di and tri(alkaryl), mono, di and tri (alkcycloalkyl), alkenyl and alkynyl where the alkyl, alkenyl and alkynyl contain 1 to about 24 carbon atoms and the cycloalkyl contains about 4 to about 8 carbon atoms, $R_{12}$ is one or more alkylene oxide, Y is an active hydrogen containing group from one of OH, SH, COOH, CONHR$_{08}$, and NR$_{09}$COOH, x13, x14, x15 and x16 are 0 or 1, and two or more of x13, x14, x15 and x16 have the value of 1 at the same time.

113. The coating composition of claim 112 wherein the monofunctional hydrophobic reagent is a mixture of dodecylphenolethoxylates.

114. The coating composition of claim 112 wherein the monofunctional hydrophobic reagent is one or more tristyrylphenol ethoxylates.

115. The water-based coating composition of claim 1 wherein the amount of the aminoplast-ether copolymer in the composition is sufficient to thicken the composition.

116. The water-based coating composition of claim 1 wherein the amount of the aminoplast-ether copolymer in the composition is sufficient to function as a wetting agent in or for the composition.

117. The water-based coating composition of claim 1 wherein the coating composition is a vinyl acetate resin containing latex.

118. The water-based coating composition of claim 1 wherein the coating composition is an acrylic resin containing coating.

* * * * *